United States Patent
Keels et al.

(10) Patent No.: US 8,699,521 B2
(45) Date of Patent: Apr. 15, 2014

(54) APPARATUS AND METHOD FOR IN-LINE INSERTION AND REMOVAL OF MARKERS

(75) Inventors: Kenneth G. Keels, Georgetown, TX (US); Jeff M. Carlson, Georgetown, TX (US); Brian S. Hausauer, Austin, TX (US); David J. Maguire, Round Rock, TX (US)

(73) Assignee: Intel-NE, Inc., Wilmington, DE (US)

( * ) Notice: Subject to any disclaimer, the term of this patent is extended or adjusted under 35 U.S.C. 154(b) by 358 days.

(21) Appl. No.: 12/986,665

(22) Filed: Jan. 7, 2011

(65) Prior Publication Data

US 2011/0099243 A1  Apr. 28, 2011

Related U.S. Application Data

(63) Continuation of application No. 11/624,849, filed on Jan. 19, 2007, now Pat. No. 7,889,762.

(60) Provisional application No. 60/760,336, filed on Jan. 19, 2006.

(51) Int. Cl.
*H04L 1/00* (2006.01)

(52) U.S. Cl.
USPC ........... 370/474; 370/464; 709/250; 714/699; 714/746; 714/752; 714/758

(58) Field of Classification Search
USPC ........... 370/464, 474; 709/250; 714/699, 746, 714/752, 758
See application file for complete search history.

(56) References Cited

U.S. PATENT DOCUMENTS

| | | | |
|---|---|---|---|
| 5,400,326 | A | 3/1995 | Smith |
| 5,434,976 | A | 7/1995 | Tan et al. |
| 5,758,075 | A | 5/1998 | Graziano et al. |
| 5,832,216 | A | 11/1998 | Szczepanek |
| 5,953,511 | A | 9/1999 | Sescila, III et al. |
| 6,052,751 | A | 4/2000 | Runaldue et al. |
| 6,067,300 | A | 5/2000 | Baumert et al. |
| 6,145,045 | A | 11/2000 | Falik et al. |
| 6,199,137 | B1 | 3/2001 | Aguilar et al. |
| 6,243,787 | B1 | 6/2001 | Kagan et al. |
| 6,389,479 | B1 | 5/2002 | Boucher et al. |
| 6,400,730 | B1 | 6/2002 | Latif et al. |

(Continued)

OTHER PUBLICATIONS

Shah, et al., "Direct Data Placement over Reliable Transports", RDMA Consortium document, Oct. 2002, pp. 1-35.

(Continued)

*Primary Examiner* — Un C Cho
*Assistant Examiner* — Siming Liu
(74) *Attorney, Agent, or Firm* — Christopher K. Gagne

(57) ABSTRACT

An apparatus is provided, for performing a direct memory access (DMA) operation between a host memory in a first server and a network adapter. The apparatus includes a host frame parser and a protocol engine. The host frame parser is configured to receive data corresponding to the DMA operation from a host interface, and is configured to insert markers on-the-fly into the data at a prescribed interval and to provide marked data for transmission to a second server over a network fabric. The protocol engine is coupled to the host frame parser. The protocol engine is configured to direct the host frame parser to insert the markers, and is configured to specify a first marker value and an offset value, whereby the host frame parser is enabled to locate and insert a first marker into the data.

8 Claims, 13 Drawing Sheets

(56) References Cited

U.S. PATENT DOCUMENTS

| | | | |
|---|---|---|---|
| 6,408,347 B1 | 6/2002 | Smith et al. |
| 6,418,201 B1 | 7/2002 | Holland et al. |
| 6,427,171 B1 | 7/2002 | Craft et al. |
| 6,502,156 B1 | 12/2002 | Sacker et al. |
| 6,535,518 B1 | 3/2003 | Hu et al. |
| 6,591,302 B2 | 7/2003 | Boucher et al. |
| 6,591,310 B1 | 7/2003 | Johnson |
| 6,594,329 B1 | 7/2003 | Susnow |
| 6,594,712 B1 | 7/2003 | Pettey et al. |
| 6,601,126 B1 | 7/2003 | Zaidi et al. |
| 6,625,157 B2 | 9/2003 | Niu et al. |
| 6,658,521 B1 | 12/2003 | Biran et al. |
| 6,661,773 B1 | 12/2003 | Pelissier et al. |
| 6,675,200 B1 | 1/2004 | Cheriton et al. |
| 6,690,757 B1 | 2/2004 | Bunton et al. |
| 6,693,901 B1 | 2/2004 | Byers et al. |
| 6,694,394 B1 | 2/2004 | Bachrach |
| 6,697,868 B2 | 2/2004 | Craft et al. |
| 6,704,831 B1 | 3/2004 | Avery |
| 6,721,806 B2 | 4/2004 | Boyd et al. |
| 6,751,235 B1 | 6/2004 | Susnow et al. |
| 6,760,307 B2 | 7/2004 | Dunning et al. |
| 6,763,419 B2 | 7/2004 | Hoese et al. |
| 6,778,548 B1 | 8/2004 | Burton et al. |
| 6,813,653 B2 | 11/2004 | Avery |
| 7,089,326 B2 | 8/2006 | Boucher et al. |
| 7,093,024 B2 | 8/2006 | Craddock et al. |
| 7,142,539 B2 | 11/2006 | Grinfeld |
| 7,149,817 B2 | 12/2006 | Pettey |
| 7,149,819 B2 | 12/2006 | Pettey |
| 7,177,941 B2 | 2/2007 | Biran et al. |
| 7,233,984 B2 | 6/2007 | Mohamed et al. |
| 7,237,510 B2 | 7/2007 | White |
| 7,299,266 B2 | 11/2007 | Boyd et al. |
| 7,299,290 B2 | 11/2007 | Karpoff |
| 7,308,551 B2 | 12/2007 | Arndt et al. |
| 7,376,755 B2 | 5/2008 | Pandya |
| 7,376,765 B2 | 5/2008 | Rangan et al. |
| 7,376,770 B2 | 5/2008 | Arndt et al. |
| 7,383,312 B2 | 6/2008 | Biran et al. |
| 7,383,483 B2 * | 6/2008 | Biran et al. ............ 714/776 |
| 7,388,866 B2 | 6/2008 | Fan et al. |
| 7,392,172 B2 | 6/2008 | Rostampour |
| 7,401,126 B2 | 7/2008 | Pekkala et al. |
| 7,426,674 B2 | 9/2008 | Anderson et al. |
| 7,430,211 B2 | 9/2008 | Elzur |
| 7,437,738 B2 | 10/2008 | Shah et al. |
| 7,451,197 B2 | 11/2008 | Davis et al. |
| 7,535,913 B2 | 5/2009 | Minami et al. |
| 7,543,087 B2 | 6/2009 | Philbrick et al. |
| 7,551,614 B2 | 6/2009 | Teisberg et al. |
| 7,565,504 B2 | 7/2009 | Garcia et al. |
| 7,688,838 B1 | 3/2010 | Aloni et al. |
| 7,782,869 B1 | 8/2010 | Chitlur Srinivasa |
| 7,782,905 B2 | 8/2010 | Keels et al. |
| 7,843,906 B1 | 11/2010 | Chidambaram et al. |
| 7,849,232 B2 | 12/2010 | Sharp et al. |
| 7,889,762 B2 | 2/2011 | Keels et al. |
| 8,032,664 B2 | 10/2011 | Sharp et al. |
| 8,078,743 B2 | 12/2011 | Sharp et al. |
| 2001/0049740 A1 | 12/2001 | Karpoff |
| 2002/0073257 A1 | 6/2002 | Beukema et al. |
| 2002/0085562 A1 | 7/2002 | Hufferd et al. |
| 2002/0147839 A1 | 10/2002 | Boucher et al. |
| 2002/0161919 A1 | 10/2002 | Boucher et al. |
| 2002/0172195 A1 | 11/2002 | Pekkala et al. |
| 2002/0191627 A1 | 12/2002 | Subbiah et al. |
| 2003/0031172 A1 | 2/2003 | Grinfeld |
| 2003/0050990 A1 | 3/2003 | Craddock et al. |
| 2003/0097428 A1 | 5/2003 | Afkhami et al. |
| 2003/0165160 A1 | 9/2003 | Minami et al. |
| 2003/0169775 A1 | 9/2003 | Fan et al. |
| 2003/0200284 A1 | 10/2003 | Philbrick et al. |
| 2003/0217185 A1 | 11/2003 | Thakur et al. |
| 2003/0237016 A1 | 12/2003 | Johnson et al. |
| 2004/0010545 A1 | 1/2004 | Pandya |
| 2004/0010594 A1 | 1/2004 | Boyd et al. |
| 2004/0015622 A1 | 1/2004 | Avery |
| 2004/0030770 A1 | 2/2004 | Pandya |
| 2004/0037319 A1 | 2/2004 | Pandya |
| 2004/0049600 A1 | 3/2004 | Boyd et al. |
| 2004/0049774 A1 | 3/2004 | Boyd et al. |
| 2004/0062267 A1 | 4/2004 | Minami et al. |
| 2004/0083984 A1 | 5/2004 | White |
| 2004/0085984 A1 | 5/2004 | Elzur |
| 2004/0093389 A1 | 5/2004 | Mohamed et al. |
| 2004/0093411 A1 | 5/2004 | Elzur et al. |
| 2004/0098369 A1 | 5/2004 | Elzur |
| 2004/0100924 A1 | 5/2004 | Yam |
| 2004/0153578 A1 | 8/2004 | Elzur |
| 2004/0193908 A1 | 9/2004 | Garcia et al. |
| 2004/0221276 A1 | 11/2004 | Raj |
| 2004/0236877 A1 | 11/2004 | Burton |
| 2005/0044264 A1 | 2/2005 | Grimminger et al. |
| 2005/0080982 A1 | 4/2005 | Vasilevsky et al. |
| 2005/0102682 A1 | 5/2005 | Shah et al. |
| 2005/0149623 A1 | 7/2005 | Biran et al. |
| 2005/0149817 A1 | 7/2005 | Biran et al. |
| 2005/0220128 A1 | 10/2005 | Tucker et al. |
| 2005/0223118 A1 | 10/2005 | Tucker et al. |
| 2005/0265352 A1 | 12/2005 | Biran et al. |
| 2006/0039374 A1 | 2/2006 | Belz et al. |
| 2006/0045098 A1 | 3/2006 | Krause |
| 2006/0105712 A1 | 5/2006 | Glass et al. |
| 2006/0126619 A1 | 6/2006 | Teisberg et al. |
| 2006/0146814 A1 | 7/2006 | Shah et al. |
| 2006/0193327 A1 | 8/2006 | Arndt et al. |
| 2006/0195617 A1 | 8/2006 | Arndt et al. |
| 2006/0230119 A1 | 10/2006 | Hausauer et al. |
| 2006/0235977 A1 | 10/2006 | Wunderlich et al. |
| 2006/0236063 A1 | 10/2006 | Hausauer et al. |
| 2006/0248047 A1 | 11/2006 | Grier et al. |
| 2006/0251109 A1 | 11/2006 | Muller et al. |
| 2006/0259644 A1 | 11/2006 | Boyd et al. |
| 2006/0274787 A1 | 12/2006 | Pong |
| 2007/0083638 A1 | 4/2007 | Pinkerton et al. |
| 2007/0136554 A1 | 6/2007 | Biran et al. |
| 2007/0150676 A1 | 6/2007 | Arimilli et al. |
| 2007/0165672 A1 | 7/2007 | Keels et al. |
| 2007/0168567 A1 | 7/2007 | Boyd et al. |
| 2007/0168693 A1 | 7/2007 | Pittman |
| 2007/0198720 A1 | 8/2007 | Rucker |
| 2007/0208820 A1 | 9/2007 | Makhervaks et al. |
| 2007/0226386 A1 | 9/2007 | Sharp et al. |
| 2007/0226750 A1 | 9/2007 | Sharp et al. |
| 2008/0028401 A1 | 1/2008 | Geisinger |
| 2008/0043750 A1 | 2/2008 | Keels et al. |
| 2008/0147822 A1 | 6/2008 | Benhase et al. |
| 2008/0244577 A1 | 10/2008 | Le et al. |
| 2009/0138574 A1 * | 5/2009 | Hui et al. ............ 709/219 |
| 2009/0254647 A1 | 10/2009 | Elzur et al. |
| 2010/0174831 A9 * | 7/2010 | Elzur ............ 709/250 |
| 2010/0332694 A1 | 12/2010 | Sharp et al. |

OTHER PUBLICATIONS

"Intel Virtual Interface (VI) Architecture Performance Suite User's Guide", Preliminary Version V0.3, Intel Corporation., Dec. 16, 1998, 28 pages.

Jinzaki, et al., "Construction of Virtual Private Distributed System by Comet", RWC 2000 Symposium, XP002243009, Japan, Jan. 2000, pp. 1-3.

Pathikonda, et al., "Virtual Interface (VI) Architecture Overview", Enterprise Server Group, Intel Corporation, Apr. 1998, pp. 1-33.

Speight, et al., "Realizing the Performance Potential of the Virtual Interface Architecture", Proceedings of the 13th international conference on Supercomputing, Rhodes, Greece, 1999, pp. 184-192.

Response to Non-Final Office Action Received for U.S. Appl. No. 09/784,761, filed Jul. 12, 2006, 35 pages.

Non-Final Office Action Received for U.S. Appl. No. 09/784,761, mailed on Feb. 14, 2006, 19 pages.

Response to Final Office action received for U.S. Appl. No. 09/784,761, filed Nov. 26, 2005, 34 pages.

(56) References Cited

OTHER PUBLICATIONS

Final Office Action Received for U.S. Appl. No. 09/784,761, mailed on Jul. 29, 2005, 25 pages.
Response to Non-Final Office Action Received for U.S. Appl. No. 09/784,761, filed Apr. 19, 2005, 34 pages.
Non-Final Office Action Received for U.S. Appl. No. 09/784,761, mailed on Feb. 14, 2005, 24 pages.
Response to Non-Final Office Action Received for U.S. Appl. No. 09/784,761, filed Sep. 29, 2004, 15 pages.
Non-Final Office Action Received for U.S. Appl. No. 09/784,761, mailed on Jul. 12, 2004, 12 pages.
Non-Final Office Action received for U.S. Appl. No. 11/356,501, mailed on Dec. 26, 2007, 12 pages.
Response to Non-Final Office Action received for U.S. Appl. No. 11/356,501, filed Mar. 26, 2008, 16 pages.
Non-Final Office Action received for U.S. Appl. No. 11/356,501, mailed on Jul. 7, 2008, 10 pages.
Response to Non-Final Office Action received for U.S. Appl. No. 11/356,501, filed Nov. 6, 2008, 16 pages.
Final Office Action received for U.S. Appl. No. 11/356,501, mailed on Jan. 22, 2009, 12 pages.
Response to Final Office Action received for U.S. Appl. No. 11/356,501, filed Apr. 2, 2009, 15 pages.
Notice of Allowance received for U.S. Appl. No. 11/356,501, mailed on Jun. 11, 2009, 8 pages.
Non-Final Office Action received for U.S. Appl. No. 09/817,008, mailed on Jul. 9, 2004, 19 pages.
Response to Non-Final Office Action received for U.S. Appl. No. 09/817,008, filed Nov. 4, 2004, 19 pages.
Non-Final Office Action received for U.S. Appl. No. 09/817,008, mailed on Nov. 18, 2005, 23 pages.
Response to Non-Final Office Action received for U.S. Appl. No. 09/817,008, filed Apr. 18, 2006, 33 pages.
Final Office Action received for U.S. Appl. No. 09/817,008, mailed on Jul. 14, 2006, 7 pages.
Response to Final Office Action received for U.S. Appl. No. 09/817,008, filed Nov. 14, 2006, 40 pages.
Non-Final Office Action received for U.S. Appl. No. 09/817,008, mailed on Feb. 9, 2007, 17 pages.
Response to Non-Final Office Action received for U.S. Appl. No. 09/817,008, filed May 9, 2007, 5 pages.
Non-Final Office Action received for U.S. Appl. No. 09/817,008, mailed on Jul. 25, 2007, 19 pages.
Response to Non-Final Office Action received for U.S. Appl. No. 09/817,008, filed Nov. 26, 2007, 21 pages.
Notice of Allowance received for U.S. Appl. No. 09/817,008, mailed on Mar. 28, 2008, 23 pages.
Non-Final Office Action received for U.S. Appl. No. 11/357,446, mailed on Jun. 3, 2008, 24 pages.
Response to Non-Final Office Action received for U.S. Appl. No. 11/357,446, filed Nov. 10, 2008, 26 pages.
Final Office Action received for U.S. Appl. No. 11/357,446, mailed on Dec. 31, 2008, 22 pages.
Non-Final Office Action received for U.S. Appl. No. 11/315,685, mailed on Feb. 18, 2009, 25 pages.
Response to Non-Final Office Action received for U.S. Appl. No. 11/315,685, filed Apr. 30, 2009, 22 pages.
Non-Final Office Action received for U.S. Appl. No. 11/357,445, mailed on Aug. 4, 2008, 18 pages.
Response to Non-Final Office Action received for U.S. Appl. No. 11/357,445, filed Nov. 7, 2008, 19 pages.
Final Office Action received for U.S. Appl. No. 11/357,445, mailed on Dec. 24, 2008, 19 pages.
Response to Final Office Action received for U.S. Appl. No. 11/357,445, filed Mar. 4, 2009, 18 pages.
Non-Final Office Action received for U.S. Appl. No. 11/357,445, mailed on Apr. 24, 2009, 21 pages.
Non-Final Office Action received for U.S. Appl. No. 11/357,449, mailed on Jun. 4, 2009, 13 pages.
Non-Final Office Action received for U.S. Appl. No. 10/737,556, mailed on Jul. 6, 2004, 10 pages.
Supplemental Non-Final Office Action received for U.S. Appl. No. 10/737,556, mailed on Sep. 21, 2004, 8 pages.
Response to Supplemental Non-Final Office Action received for U.S. Appl. No. 10/737,556, filed Oct. 12, 2004, 4 pages.
Non-Final Office Action received for U.S. Appl. No. 10/737,556, mailed on Jan. 26, 2005, 11 pages.
Response to Non-Final Office Action received for U.S. Appl. No. 10/737,556, filed Apr. 19, 2005, 24 pages.
Final Office Action received for U.S. Appl. No. 10/737,556, mailed on Jul. 28, 2005, 19 pages.
Response to Final Office Action received for U.S. Appl. No. 10/737,556, filed Nov. 26, 2005, 27 pages.
Non-Final Office Action received for U.S. Appl. No. 10/737,556, mailed on Feb. 14, 2006, 14 pages.
Non-Final Office Action received for the U.S. Appl. No. 11/315,685, mailed on Dec. 20, 2010, 32 pages.
Final Office Action received for the U.S. Appl. No. 11/315,685, mailed on Mar. 7, 2011, 31 pages.
Response to Non-Final Office Action received for the U.S. Appl. No. 11/315,685, filed Feb. 25, 2011, 20 pages.
Final Office Action received for U.S. Appl. No. 11/356,493, mailed on Feb. 15, 2011, 17 pages.
Non Final Office Action received for U.S. Appl. No. 11/356,500, mailed on Mar. 31, 2011, 14 pages.
Response to Final Office Action received for the U.S. Appl. No. 11/356,500, filed Mar. 17, 2011, 10 pages.
Final Office Action received for U.S. Appl. No. 12/874,739, mailed on Jan. 19, 2011, 12 pages.
Response to Non-Final Office Action received for U.S. Appl. No. 12/874,739, filed Mar. 3, 2011, 10 pages.
Non Final Office Action Received for U.S. Appl. No. 11/315,685, mailed on May 9, 2011, 39 pages.
Response to Non-Final Office Action Received for U.S. Appl. No. 11/315,685, filed Apr. 20, 2011, 23 pages.
Non Final Office Action Received for U.S. Appl. No. 11/356,493, mailed on May 24, 2011, 18 pages.
Response to Non-Final Office Action received for U.S. Appl. No. 11/356,493, filed Apr. 15, 2011, 10 pages.
Response to Non-Final Office Action received for U.S. Appl. No. 10/737,556, filed Jul. 12, 2006, 31 pages.
Notice of Allowance received for U.S. Appl. No. 10/737,556, mailed on Oct. 3, 2006, 12 pages.
Notice of Allowance received for U.S. Appl. No. 09/784,761, mailed on Oct. 6, 2006, 14 pages.
Mayo, John S., The role of microelectronics in communication, Scientific American, Sep. 1977, pp. 192-209.
Warmke, Doug Building Up Chips Using VHDL and Synthesis, System Design, Dec. 1994/Jan. 1995, pp. 1-7.
Amendment after Notice of Allowance received for U.S. Appl. No. 09/817,008, filed Apr. 2, 2008, 20 pages.
Final Office Action received for U.S. Appl. No. 11/315,685, mailed on Aug. 11, 2009, 34 pages.
Notice of Allowance received for U.S. Appl. No. 11/356,501, mailed on Aug. 7, 2009, 22 pages.
Response to Non-Final Office Action received for U.S. Appl. No. 11/357,445, filed Jul. 8, 2009, 12 pages.
Response to Non-Final Office Action received for U.S. Appl. No. 11/357,449, filed Aug. 17, 2009, 10 pages.
Response to Final Office Action received for U.S. Appl. No. 11/315,685, filed Sep. 17, 2009, 22 pages.
Final Office Action received for U.S. Appl. No. 11/357,445, mailed on Sep. 10, 2009, 43 pages.
Non-Final Office Action received for U.S. Appl. No. 11/356,493, mailed on Sep. 21, 2009, 26 pages.
Amendment after Notice of Allowance received for U.S. Appl. No. 11/356,501, filed Oct. 8, 2009, 11 pages.
Response to Final Office Action received for U.S. Appl. No. 11/357,445, filed Nov. 10, 2009, 17 pages.
Notice of Allowance received for U.S. Appl. No. 11/356,501, mailed on Nov. 24, 2009, 12 pages.

(56) References Cited

OTHER PUBLICATIONS

Final Office Action received for U.S. Appl. No. 11/357,449, mailed on Nov. 18, 2009, 17 pages.
Response to Non-Final Office Action received for U.S. Appl. No. 11/356,493, filed Nov. 17, 2009, 13 pages.
Non-Final Office Action received for U.S. Appl. No. 11/624,849, mailed on Nov. 23, 2009, 34 pages.
Non-Final Office Action received for U.S. Appl. No. 11/357,449, mailed on Dec. 21, 2009, 8 pages.
Response to Final Office Action received for U.S. Appl. No. 11/357,449, filed Dec. 8, 2009, 13 pages.
Non-Final Office Action received for U.S. Appl. No. 11/315,685, mailed on Jan. 4, 2010, 26 pages.
Response to Non-Final Office Action received for U.S. Appl. No. 11/624,849, filed Jan. 22, 2010, 15 pages.
Non-Final Office Action received for U.S. Appl. No. 11/356,493, mailed on Feb. 3, 2010, 15 pages.
Response to Non-Final Office Action received for U.S. Appl. No. 11/357,449, filed Mar. 4, 2010, 12 pages.
Response to Office Action received for U.S. Appl. No. 11/315,685, filed Mar. 5, 2010, 24 pages.
Final Office Action received for U.S. Appl. No. 11/624,849, mailed on Mar. 10, 2010, 15 pages.
Non-Final Office Action received for U.S. Appl. No. 11/356,500, mailed on Mar. 18, 2010, 28 pages.
Amendment after Notice of Allowance received for U.S. Appl. No. 11/356,501, filed Jan. 29, 2010, 10 pages.
Response to Final Office Action received for U.S. Appl. No. 11/624,849, filed Mar. 31, 2010, 14 pages.
Response to Non-Final Office Action received for U.S. Appl. No. 11/356,493, filed Apr. 2, 2010, 13 pages.
Non-Final Office Action received for U.S. Appl. No. 11/356,501, mailed on Apr. 13, 2010, 16 pages.
Response to Non-Final Office Action received for U.S. Appl. No. 11/356,500, filed May 17, 2010, 15 pages.
Notice of Allowance received for U.S. Appl. No. 11/356,501, mailed on Aug. 19, 2010, 15 pages.
Final Office Action received for U.S. Appl. No. 11/315,685, mailed on May 14, 2010, 34 pages.
Non-Final Office Action received for U.S. Appl. No. 11/624,849, mailed on May 24, 2010, 11 pages.
Response to Non-Final Office Action received for U.S. Appl. No. 11/356,501, filed May 28, 2010, 14 pages.
Notice of Allowance received for U.S. Appl. No. 11/357,449, mailed on Jun. 8, 2010, 13 pages.
Response to Office Action received for U.S. Appl. No. 11/315,685, mailed on Jul. 8, 2010, 23 pages.
Final Office Action received for U.S. Appl. No. 11/356,493, mailed on Jul. 8, 2010, 17 pages.
Response to the Non Final Office Action received for U.S. Appl. No. 11/624,849, filed Jul. 29, 2010, 12 pages.
Non-Final Office Action received for U.S. Appl. No. 11/356,500, mailed on Aug. 3, 2010, 17 pages.
Response to Final Office Action received for U.S. Appl. No. 11/356,493, filed Sep. 9, 2010, 9 pages.
Final Office Action received for U.S. Appl. No. 11/624,849, mailed on Oct. 14, 2010, 11 pages.
Non Final Office Action received for the U.S. Appl. No. 11/356,493, mailed on Oct. 13, 2010, 17 pages.
Response to Non Final Office Action filed for U.S. Appl. No. 11/356,500, filed Oct. 7, 2010, 10 pages.
Notice of Allowance received for the U.S. Appl. No. 11/624,849, mailed on Dec. 20, 2010, 6 pages.
Response to Final Office Action received for the U.S. Appl. No. 11/624,849, filed Dec. 8, 2010, 9 pages.
Response to Non-Final Office Action received for the U.S. Appl. No. 11/356,493, filed Jan. 3, 2011, 10 pages.
Final Office Action received for the U.S. Appl. No. 11/356,500, mailed on Dec. 21, 2010, 41 pages.
Final Office Action received for U.S. Appl. No. 11/315,685, mailed on Jul. 19, 2011, 44 pages.
Request for Continued Examination and Response to Final Office action filed for U.S. Appl. No. 11/315,685, filed Sep. 19, 2011, 24 pages.
Response to Non-Final Office Action Received for U.S. Appl. No. 11/315,685, filed Jun. 15, 2011, 26 pages.
Notice of Allowance received for U.S. Appl. No. 11/356,493, mailed on Oct. 3, 2011, 17 pages.
Response to Non-Final Office Action Received for U.S. Appl. No. 11/356,493, filed Jul. 13, 2011, 10 pages.
Final Office action received for U.S. Appl. No. 11/356,500, mailed on Sep. 1, 2011, 21 pages.
Request for Continued Examination and Response to Final Office action filed for U.S. Appl. No. 11/356,500, filed Nov. 21, 2011, 15 pages.
Response to Non-Final Office Action Received for U.S. Appl. No. 11/356,500, filed Jun. 10, 2011, 12 pages.
Notice of Allowance Received for U.S. Appl. No. 12/874,739, mailed on Jun. 1, 2011, 115 pages.

* cited by examiner

LAYERED PROTOCOL FOR REMOTE DIRECT MEMORY ACCESS OPERATIONS

MPA HEADER, MARKER, AND CRC ALIGNMENT WITHIN AN ETHERNET FRAME

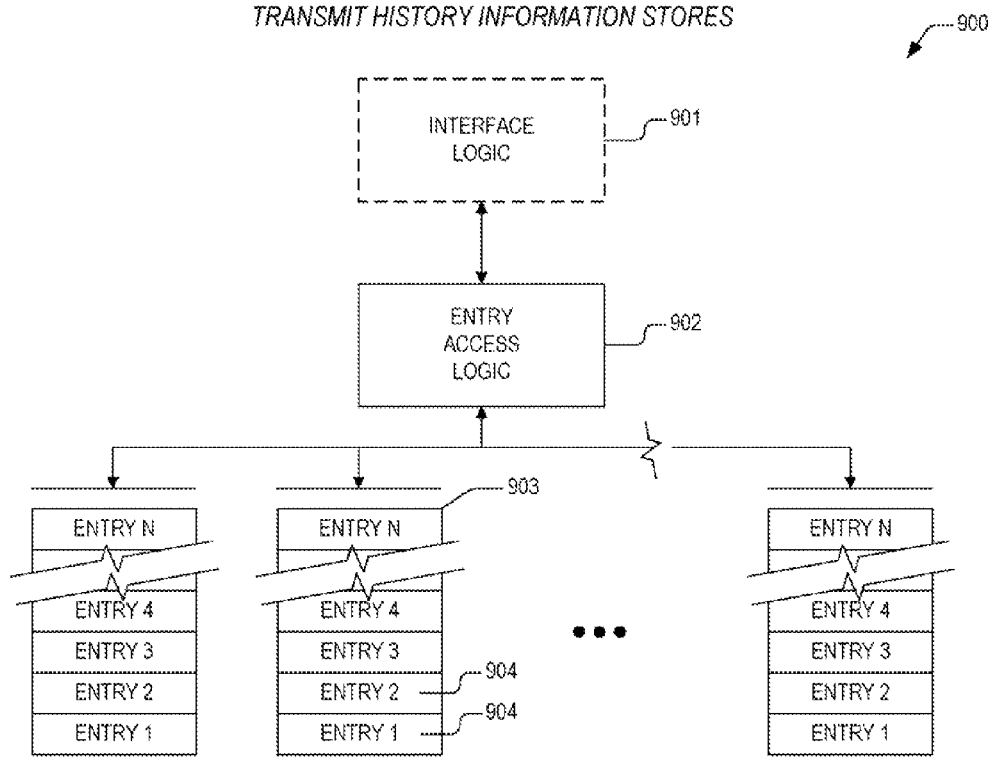

RDMA-ENABLED SERVER FEATURING ON-THE-FLY MPA MARKER INSERTION/REMOVAL

APPARATUS AND METHOD FOR IN-LINE INSERTION AND REMOVAL OF MARKERS

CROSS-REFERENCE TO RELATED APPLICATIONS

This application is a continuation of prior co-pending U.S. patent application Ser. No. 11/624,849 filed Jan. 19, 2007, which prior co-pending application claims the benefit of U.S. Provisional Application Ser. No. 60/760,336 filed on Jan. 19, 2006, which prior co-pending application and provisional application are herein incorporated by reference for all intents and purposes.

This application is related to the following co-pending U.S. patent applications, all of which have a common assignee and common inventors.

| SERIAL NUMBER | FILING DATE | TITLE |
| --- | --- | --- |
| 11/315,685 (BAN.0202) | Dec. 22, 2005 | APPARATUS AND METHOD FOR PACKET TRANSMISSION OVER A HIGH SPEED NETWORK SUPPORTING REMOTE DIRECT MEMORY ACCESS OPERATIONS |
| 11/357,445 (BAN.0205) | Feb. 17, 2006 | APPARATUS AND METHOD FOR OUT-OF-ORDER PLACEMENT AND IN-ORDER COMPLETION REPORTING OF REMOTE DIRECT MEMORY ACCESS OPERATIONS |
| 11/357,449 (BAN.0220) | Feb. 17, 2006 | APPARATUS AND METHOD FOR STATELESS CRC CALCULATION |

BACKGROUND OF THE INVENTION

1. Field of the Invention

This invention relates in general to the field of computer communications and more specifically to an apparatus and method for effectively and efficiently inserting and removing MPA markers into a TCP byte stream for communicating via an RDMA-over-Ethernet fabric.

2. Description of the Related Art

The first computers were stand-alone machines, that is, they loaded and executed application programs one-at-a-time in an order typically prescribed through a sequence at instructions provided by keypunched batch cards or magnetic tape. All of the data required to execute a loaded application program was provided by the application program as input data and execution results were typically output to a line printer. Even though the interface to early computers was cumbersome at best, the sheer power to rapidly perform computations made these devices very attractive to those in the scientific and engineering fields.

The development of remote terminal capabilities allowed computer technologies to be more widely distributed. Access to computational equipment in real time fostered the introduction of computers into the business world. Businesses that processed large amounts of data, such as the insurance industry and government agencies, began to store, retrieve, and process their data on computers. Special applications were developed to perform operations on shared data within a single computer system.

During the mid 1970's, a number of successful attempts were made to interconnect computers for purposes of sharing data and/or processing capabilities. These interconnection attempts, however, employed special purpose protocols that were intimately tied to the architecture of these computers. As such, the computers were expensive to procure and maintain and their applications were limited to those areas of the industry that heavily relied upon shared data processing capabilities.

The U.S. government, however, realized the power that could be harnessed by allowing computers to interconnect, and thus funded research that resulted in what we now know as the Internet. More specifically, this research resulted in a series of standards that specify the details of how interconnected computers are to communicate, how to interconnect networks of computers, and how to route traffic over these interconnected networks. This set of standards is known as the TCP/IP Internet Protocol Suite, named after its two predominant protocol standards, Transport Control Protocol (TCP) and Internet Protocol (IP). TCP is a protocol that allows for a reliable byte stream connection between two computers. IP is a protocol that provides an addressing and routing mechanism for unreliable transmission of datagrams across a network of computers. The use of TCP/IP allows a computer to communicate across any set of interconnected networks, regardless of the underlying native network protocols that are employed by these networks. Once the interconnection problem was solved by TCP/IP, networks of interconnected computers began to crop up in all areas of business.

The ability to easily interconnect computer networks for communication purposes provided the motivation for the development of distributed application programs, that is, application programs that perform certain tasks on one computer connected to a network and certain other tasks on another computer connected to the network. The sophistication of distributed application programs has steadily evolved over more recent years into what we today call the client-server model. According to the model, "client" applications on a network make requests for service to "server" applications on the network. The "server" applications perform the service and return the results of the service to the "client" over the network. In an exact sense, a client and a server may reside on the same computer, but the more common employment of the model finds clients executing on smaller, less powerful, less costly computers connected to a network and servers executing on more powerful, more expensive computers. In fact, the proliferation of client-server applications has resulted in a class of high-end computers being known as "servers" because they are primarily used to execute server applications. Similarly, the term "client machine" is often used to describe a single-user desktop system that executes client applications.

Client-server application technology has enabled computer usage to be phased into the business mainstream. Companies began employing interconnected client-server networks to centralize the storage of files, company data, manufacturing data, etc., on servers and allowed employees to access this data via clients. Servers today are sometimes known by the type of services that they perform. For example, a the server provides client access to centralized files, a mail server provides access to a company's electronic mail, a data base server provides client access to a central data base, and so on.

The development of other technologies such as hypertext markup language (HTML) and extensible markup language (XML) now allows user-friendly representations of data to be transmitted between computers. The advent of HTML/XML-based developments has resulted in an exponential increase in the number of computers that are interconnected because, now, even home-based businesses can develop server applications that provide services accessible over the Internet from any computer equipped with a web browser application (i.e., a web "client"). Furthermore, virtually every computer produced today is sold with web client software. In 1988, only 5,000 computers were interconnected via the Internet. In 1995, under five million computers were interconnected via the Internet. But with the maturation of client-server and HTML technologies, presently, over 50 million computers access the Internet. And the growth continues.

The number of servers in a present day data center may range from a single server to hundreds of interconnected servers. And the interconnection schemes chosen for those applications that consist of more than one server depend upon the type of services that interconnection of the servers enables. Today, there are three distinct interconnection fabrics that characterize a multi-server configuration. Virtually all multi-server configurations have a local area network (LAN) fabric that is used to interconnect any number of client machines to the servers within the data center. The LAN fabric interconnects the client machines and allows the client machines access to the servers and perhaps also allows client and server access to network attached storage (NAS), if provided. One skilled in the art will appreciate that TCP/IP over Ethernet is the most commonly employed protocol in use today for a LAN fabric, with 100 Megabit (Mb) Ethernet being the most common transmission speed and 1 Gigabit (Gb) Ethernet gaining prevalence in use. In addition, 10 Gb Ethernet links and associated equipment are currently being fielded.

The second type of interconnection fabric, if required within a data center, is a storage area network (SAN) fabric. The SAN fabric provides for high speed access of block storage devices by the servers. Again, one skilled in the art will appreciate that Fibre Channel is the most commonly employed protocol for use today for a SAN fabric, transmitting data at speeds up to 2 Gb per second, with 4 Gb per second components that are now in the early stages of adoption.

The third type of interconnection fabric, if required within a data center, is a clustering network fabric. The clustering network fabric is provided to interconnect multiple servers to support such applications as high-performance computing, distributed databases, distributed data store, grid computing, and server redundancy. A clustering network fabric is characterized by super-fast transmission speed and low-latency. There is no prevalent clustering protocol in use today, so a typical clustering network will employ networking devices developed by a given manufacturer. Thus, the networking devices (i.e., the clustering network fabric) operate according to a networking protocol that is proprietary to the given manufacturer. Clustering network devices are available from manufacturers such as Quadrics Inc. and Myricom. These network devices transmit data at speeds greater than 1 Gb per second (Gb/sec) with latencies on the order of microseconds. It is interesting, however, that although low latency has been noted as a desirable attribute for a clustering network, more than 50 percent of the clusters in the top 500 fastest computers today use TCP/IP over Ethernet as their interconnection fabric.

It has been observed by many in the art that a significant performance bottleneck associated with networking in the near term will not be the network fabric itself, as has been the case in more recent years. Rather, the bottleneck is now shifting to the processor. More specifically, network transmissions will be limited by the amount of processing required of a central processing unit (CPU) to accomplish TCP/IP operations at 1 Gb/sec (and greater) speeds. In fact, the present inventors have noted that approximately 40 percent of the CPU overhead associated with TCP/IP operations is due to transport processing, that is, the processing operations that are required to allocate buffers to applications, to manage TCP/IP link lists, etc. Another 20 percent of the CPU overhead associated with TCP/IP operations is due to the processing, operations which are required to make intermediate buffer copies, that is, moving data from a network adapter buffer, then to a device driver buffer, then to an operating system buffer, and finally to an application buffer. And the final 40 percent of the CPU overhead associated with TCP/IP operations is the processing required to perform context switches between an application and its underlying operating system which provides the TCP/IP services. Presently, it is estimated that it takes roughly 1 GHz of processor bandwidth to provide for a typical 1 Gb/second TCP/IP network. Extrapolating this estimate up to that required to support a 10 Gb/second TCP/IP network provides a sufficient basis for the consideration of alternative configurations beyond the TCP/IP stack architecture of today, most of the operations of which are provided by an underlying operating system.

As alluded to above, it is readily apparent that TCP/IP processing overhead requirements must be offloaded from the processors and operating systems within a server configuration in order to alleviate the performance bottleneck associated with current and future networking fabrics. This can be accomplished in principle by 1) moving the transport processing requirements from the CPU down to a network adapter; 2) providing a mechanism for remote direct memory access (RDMA) operations, thus giving the network adapter the ability to transfer data directly to/from application memory; and 3) providing a user-level direct access technique that allows an application to directly command the network adapter to send/receive data, thereby bypassing the underlying operating system.

The INFINIBAND™ protocol vas an ill-fated attempt to accomplish these three "offload" objectives, while at the same time attempting to increase data transfer speeds within a data center. In addition, INFINIBAND attempted to merge the three disparate fabrics (i.e., LAN, SAN, and cluster) by providing a unified point-to-point fabric that, among other things, completely replaces Ethernet, Fibre Channel, and vendor-specific clustering networks. On paper and in simulation, the INFINIBAND protocol was extremely attractive from a performance perspective because it enabled all three of the above objectives and increased networking throughput overall. Unfortunately, the architects of INFINIBAND overestimated the community's willingness to abandon their tremendous investment in existing networking infrastructure, particularly that associated with Ethernet fabrics. And as a result, INFINIBAND has not become a viable option for the marketplace.

INFINIBAND did, however, provide a very attractive mechanism for offloading reliable connection network transport processing from a CPU and corresponding operating system. One aspect of this mechanism is the use of "verbs." Verbs is an abstract architected programming interface between a network input/output (I/O) adapter and a host operating system (OS) or application software, which 1) enables moving reliable connection transport processing from a host CPU to the I/O adapter; 2) provides for the I/O adapter to perform direct data placement (DDP) through the use of RDMA read messages and RDMA write messages, as will be described in greater detail below; and 3) enables bypass of the OS. INFINIBAND defined a new type of reliable connection transport for use with verbs, but as one skilled in the art will appreciate, a verbs interface mechanism will work equally well with the TCP reliable connection transport. At a very high level, this mechanism consists of providing a set of commands ("verbs") which can be executed by an application program, without operating system intervention, that direct an appropriately configured network adapter (not part of the CPU) to directly transfer data to/from server (or "host") memory, across a network fabric, where commensurate direct data transfer operations are performed in host memory of a counterpart server. This type of operation, as noted above, is referred to as RDMA, and a network adapter that is configured to perform such operations is referred to as an RDMA-enabled network adapter. In essence, an application executes a verb to transfer data and the RDMA-enabled network adapter moves the data over the network fabric to/from host memory.

Many in the art have attempted to preserve the attractive attributes of INFINIBAND (e.g., reliable connection network transport offload, verbs, RDMA) as part of a networking protocol that utilizes Ethernet as an underlying network fabric. In fact, over 50 member companies are now part of what is known as the RDMA Consortium (www rdmaconsortium.org), an organization founded to foster industry standards and specifications that support RDMA over TCP. RDMA over TCP/IP defines the interoperable protocols to support RDMA operations over standard TCP/IP networks. To date, the RDMA Consortium has released four specifications that provide for RDMA over TCP, as follows, each of which is incorporated by reference in its entirety for all intents and purposes:

Hilland et al. "RDMA Protocol Verbs Specification (Version 1.0)." April, 2003, RDMA Consortium. Portland, Oreg. (http://www.rdmaconsortium.org/home/draft-hilland-iwarp-verbs-v1.0-rdmac.pdf).

Recio et al. "An RDMA Protocol Specification (Version 1.0)." October 2002. RDMA Consortium. Portland, Oreg. (http://www.rdmaconsortium.org/home/draft-recio-iwarp-rdmap-v1.0.pdf).

Shah et al. "Direct Data Placement Over Reliable Transports Version 1.0)." October 2002. RDMA Consortium. Portland, Oreg. (http://www.rdmaconsortium.org/home/draft-shah-iwarp-ddp-v1.0.pdf).

Culley et al. "Marker PDU Aligned Framing for TCP Specification (Version 1.0)." Oct. 25, 2002. RDMA Consortium. Portland, Oreg. (http://www.rdmaconsortium.org/home/draft-culley-iwarp-mpa-v1.0.pdf).

The RDMA Verbs specification and the suite of three specifications that describe the RDMA over TCP protocol have been completed. RDMA over TCP/IP specifies an RDMA layer that will intemperate over a standard TCP/IP transport layer, RDMA over TCP does not specify a physical layer, but will work over Ethernet, wide area networks (WAN), or any other network where TCP/IP is used. The RDMA Verbs specification is substantially similar to that provided for by INFINIBAND. In addition, the aforementioned specifications have been adopted as the basis for work on RDMA by the Internet Engineering Task Force (IETF). The IETF versions of the RDMA over TCP specifications follow.

"Marker PDU Aligned Framing for TCP Specification (Sep. 27, 2005)" http://www.ietf.org/internet-drafts/draft-ietf-rddp-mpa-03.pdf "Direct Data Placement over Reliable Transports (July 2005)" http://www.ietf.org/internet-drafts/draft-ietf-rddp-ddp-05.txt "An RDMA Protocol Specification (Jul. 17, 2005)" http://www.ietf.org/internet-drafts/draft-ietf-rddp-rdmap-05.txt Remote Direct Data Placement (rddp) Working Group http://www.ietf.org/html.charters/rddp-charter.html In view of the above developments in the art, it is anticipated that RDMA over TCP/IP, with Ethernet as the underlying network fabric, will over the near term become as ubiquitous within data centers as are currently fielded TCP/IP-based fabrics. The present inventors contemplate that as RDMA over TCP/IP gains prevalence for use as a LAN fabric, data center managers will recognize that increased overall cost of ownership benefits can be had by moving existing SAN and clustering fabrics over to RDMA over TCP/IP as well.

But, as one skilled in the art will appreciate, TCP is a reliable connection transport protocol that provides a stream of bytes, with no inherent capability to demarcate message boundaries for an upper layer protocol (ULP). The RDMA Consortium specifications "Direct Data Placement Over Reliable Transports (Version 1.0)" and "Marker PDU Aligned Framing for TCP Specification (Version 1.0)," among other things specifically define techniques for demarcating RDMA message boundaries and for inserting "markers" into a message, or "protocol data unit" (PDU), that is to be transmitted over a TCP transport byte stream so that an RDMA-enabled network adapter on the receiving end can determine if and when a complete message has been received over the fabric. A framed PDU (FPDU) can contain 0 or more markers. An FPDU is not a message per se. Rather, an FPDU is a portion of a ULP payload that is framed with a marker PDU aligned (MPA) header, that has optional MPA markers inserted at regular intervals in TCP sequence space, and which additionally is padded with up to three octets of zeros (to make the size of the FPDU an integral multiple of four) and has a 32-bit cyclic redundancy check (CRC) appended thereto. The MPA markers are 32-bits and are inserted at 512 octet intervals in the TCP sequence number space. A given MPA marker provides a relative pointer that indicates the number of octets in the TCP sequence stream from the beginning of a corresponding FPDU to the first octet of the given MPA marker. An MPA header provides the length of its corresponding PDU and thus, each MPA marker facilitates location of a corresponding MPA Header, from which a receiver can determine message boundaries for purposes that include computation of the 32-bit CRC. A message consists of one or more direct data placement DDP segments, and has the following general types: Send Message, RDMA Read Request Message, RDMA Read Response Message, and RDMA Write Message. These techniques are required to enhance the streaming capability limitation of TCP and must be implemented by any RDMA-enabled network adapter.

The present inventors have noted that there are several problems associated with implementing an RDMA-enabled network adapter so that PDUs are reliably handled with acceptable latency over an TCP/IP Ethernet fabric. First and foremost, as one skilled in the art will appreciate, TCP does not provide for acknowledgement of messages. Rather, TCP provides for acknowledgement of TCP segments (or partial TCP segments), many of which may be employed to transmit a message under RDMA over TCP/IP. Yet, the RDMAC Verbs Specification requires that an RDMA-enabled adapter provide message completion information to the verbs user in the form of Completion Queue Elements (CQEs). And the CQEs are typically generated using inbound TCP acknowledgements. Thus, it is required that an RDMA-enabled network adapter be capable of rapidly determining if and when a complete message has been received. In addition, the present inventors have noted a requirement for an efficient mechanism to allow for reconstruction and retransmission of TCP segments under normal network error conditions such as dropped packets, timeout, and etc. It is furthermore required that a technique be provided that allows an RDMA-enabled network adapter to efficiently rebuild an FPDU (including correct placement of markers therein) under conditions where the maximum segment size (MSS) for transmission over the network fabric is dynamically changed. The present inventors have also observed that it is desirable to provide a technique for efficiently inserting message markers into TCP segments that are being constructed for transmission and a corresponding technique for removal of markers from received TCP segments There are additional requirements specified in the above noted RDMAC and IETF specifications that are provided to minimize the number of intermediate buffer copies associated with TCP/IP operations. Direct placement of data that is received out of order (e.g., partial message data) is allowed, but delivery (e.g., "completion") of messages must be performed in order. More specifically, a receiver may perform placement of received DDP Segments out of order and it furthermore may perform placement of a DDP Segment more than once. But the receiver must deliver complete messages only once and the completed messages must be delivered in the order they were sent. A message is considered completely received if and only if the last DDP segment of the message has its last flag set (i.e., a bit indicating that the corresponding DDP segment is the last DDP segment of the message), all of the DDP segments of the message have been previously placed, and all preceding messages have been placed and delivered.

An RDMA-enabled network adapter can implement these requirements for some types of RDMA messages by using information that is provided directly within the headers of received DDP segments. But the present inventors have observed that other types of RDMA messages (e.g. RDMA Read Response, RDMA Write) do not provide the same type of information within the headers of their respective DDP segments. Consequently, data (i.e., payloads) corresponding to these DDP segments can be directly placed in host memory, yet the information provided within their respective headers cannot be directly employed to uniquely track or report message completions in order as required.

Accordingly, the present inventors have noted that it is desirable to provide apparatus and methods that enable an RDMA-enabled network adapter to effectively and efficiently track and report completions of RDMA messages within a protocol suite that allows for out-of-order placement of data.

And, as alluded to above, the techniques for demarcating RDMA message boundaries by providing MPA headers, inserting MPA markers into a PDU, and post-pending the 32-bit MPA CRC allow a receiver to place data that is received out of order thereby saving a significant amount of intermediate storage, and additionally overcomes the known limitations of TCP checksums, which have been shown to indicate errors at a much higher rate than underlying link characteristics would suggest.

But, given that TCP is a stream-oriented transport protocol, it is highly probable that a packet that is received may have anywhere from zero to approximately 20 MPA markers (depending upon network capabilities) embedded therein, and may comprise a partial PDU, a complete PDU, or a combination of partial and complete PDUs, thereby rendering calculation of the 32-bit MPA CRC difficult at best, particularly at 10 Gb/sec line speeds.

Consequently, the present inventors have noted that it is highly desirable to provide apparatus and methods that enable an RDMA-enabled network adapter to effectively and efficiently perform speculative MPA CRC calculations on arriving packets to preclude latencies that would otherwise be incurred due to the streaming nature of TCP.

In addition to performing these speculative MPA CRC calculations, it is also highly desirable to be able to rapidly locate and remove the MPA markers from a received packet prior to placing the data in user memory. It is also desirable that location and removal of the MPA markers be accomplished without requiring the use of additional buffers. It is furthermore advantageous to quickly locate and insert MPA markers into user data being provided over a host interface as a packet is being constructed for transmission. Insertion of MPA markers into the packet should also be accomplished without requiring the use of additional buffers.

SUMMARY OF THE INVENTION

The present invention, among other applications, is directed to solving the above-noted problems and addresses other problems, disadvantages, and limitations of the prior art. The present invention provides a superior technique for enabling efficient and effective insertion/removal of markers into/from a TCP byte stream that is configured to communicate via a network fabric, in one embodiment, an apparatus is provided, for performing a direct memory access (DMA) operation between a host memory in a first server and a network adapter. The apparatus includes a host frame parser and a protocol engine. The host frame parser is configured to receive data corresponding to the DMA operation from a host interface, and is configured to insert markers on-the-fly into the data at a prescribed interval and to provide marked data for transmission to a second server over a network fabric. The protocol engine is coupled to the host frame parser. The protocol engine is configured to direct the host frame parser to insert the markers, and is configured to specify a first marker value and an offset value, whereby the host frame parser is enabled to locate and insert a first marker into the data.

One aspect of the present invention contemplates an apparatus, for performing a direct memory access (DMA) operation between a host memory in a first server and a network adapter. The apparatus has a host frame parser and a protocol engine. The host frame parser is configured to receive marked data received from a second server over a network fabric, and is configured to remove markers on-the-fly from the marked data at a prescribed interval, and is configured to provide data corresponding to the DMA operation to a host interface. The protocol engine is coupled to the host frame parser. The protocol engine is configured to direct the host frame parser to remove the markers, and is configured to specify an offset value, whereby the host frame parser is enabled to locate and remove a first marker from the marked data.

Another aspect of the present invention comprehends a method for performing a direct memory access (DMA) operation between a host memory in a first server and a network adapter. The method includes, within a host frame parser, receiving data corresponding to the DMA operation from a host interface, and inserting markers on-the-fly into the data at a prescribed interval, and providing marked data for transmission to a second server over a network fabric; and directing the host frame parser to insert the markers by specifying a first marker value and an offset value.

A further aspect of the present invention provides for performing a direct memory access (DMA) operation between a host memory in a first server and network adapter. The method includes, within a host frame parser, receiving marked data received from a second server over a network fabric, and removing markers on-the-fly from the marked data at a prescribed interval, and providing data corresponding to the DMA operation to a host interface; and directing the host frame parser to remove the markers by specifying an offset value.

BRIEF DESCRIPTION OF THE DRAWINGS

These and other objects, features, and advantages of the present invention will become better understood with regard to the following description, and accompanying drawings where:

FIG. 9 is a block diagram showing details of transmit history information stores within a network adapter according to the present invention;

FIG. 10 is a block diagram providing details of an exemplary transmit FIFO buffer entry according to the present invention;

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

In view of the above background discussion on protocols that enable remote direct memory access and associated techniques employed within present day systems for accomplishing the offload of TCP/IP operations from a server CPU, a discussion of the present invention will now be presented with reference to FIGS. 1-15. Use of the present invention 1) permits servers to offload virtually all of the processing associated with TCP/IP operations; 2) employs Ethernet as an underlying network fabric; 3) provides an efficient mechanism for rebuilding and retransmitting TCP segments in the event of network error and for signaling completion of one or more RDMA operations to a requesting consumer application; 4) provides for efficient error checking of FPDUs by performing speculative calculations of corresponding MPA CRCs; and 5) provides for in-line insertion and removal of MPA markers required by RDMA-over-TCP protocol specifications.

Figure 1:
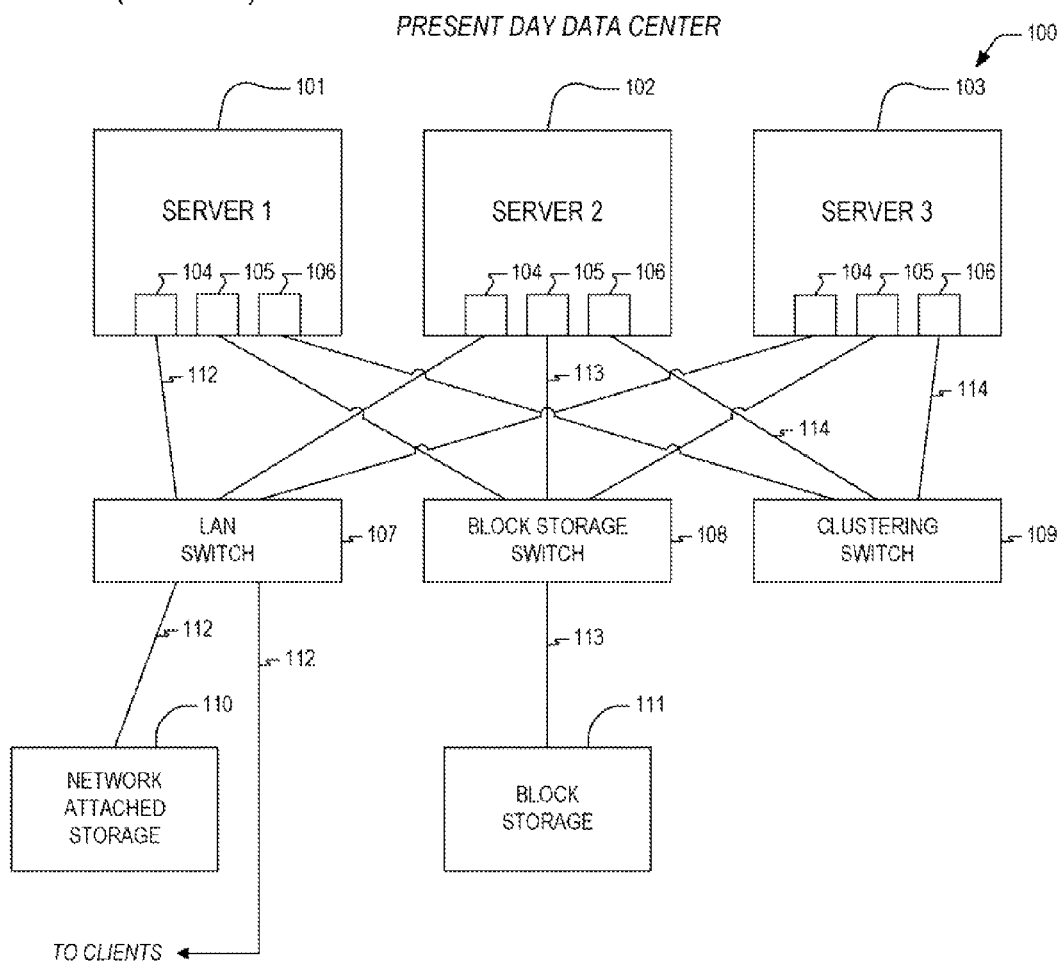
FIG. 1 is a related art diagram illustrating a typical present day data center that provides for a LAN fabric, a SAN fabric, and a clustering fabric.

Now referring to FIG. 1, a related art diagram is presented illustrating a typical present day multi-server configuration 100 within an exemplary data center that interconnects three servers 101-103 and that provides for a LAN, a SAN, and a cluster network. The servers 101-103 are interconnected over the LAN to clients and to network attached storage (NAS) 110 via a LAN fabric that consists of multiple point-to-point LAN links 112 that are interconnected via, one or more LAN switches 107. The servers 101-103 each connect up to the LAN via a LAN network adapter 104. As alluded to above, virtually all present day LANs utilize TCP/IP over Ethernet as the networking protocol. The servers 101-103 are also interconnected over the SAN to one or more block storage devices 111 via a SAN fabric that consists of multiple point-to-point SAN links 113 that are interconnected via one or more SAN switches 108. The servers 101-103 each connect up to the SAN via a SAN network adapter 105. As is also noted above, most present day SANS utilize Fibre Channel as the networking protocol. And many installations employ the Small Computer Systems interface (SCSI) protocol on top of Fibre Channel to enable transport of data to/from the block storage 111. The servers 101-103 are additionally interconnected over the cluster network to each other to allow for high performance computing applications as noted above. The cluster network consists of multiple point-to-point cluster links 114 that are interconnected via one or more clustering switches 109. The servers 101-103 each connect up to the cluster network via a cluster network adapter 106. As is also noted above, there is no industry standard for clustering networks, but companies such as Quadrics Inc, and Myricom produce proprietary cluster network adapters 106, clustering switches 109, and links 114 that support high-speed, low latency cluster fabrics.

From a total cost of ownership perspective, one skilled in the art will appreciate that a data center manager must maintain expertise and parts for three entirely disparate fabrics and must, in addition, field three different network adapters 104-106 for each server 101-103 that is added to the data center. In addition, one skilled in the art will appreciate that the servers 101-103 within the data center may very well be embodied as blade servers 101-103 mounted within a blade server rack (not shown) or as integrated server components 101-103 mounted within a single multi-server blade (not shown). For these, and other alternative data center configurations, it is evident that the problem of interconnecting servers over disparate network fabrics becomes more complicated as the level of integration increases.

Add to the above the fact that the underlying network speeds as seen on each of the links 112-114 is increasing beyond the processing capabilities of CPUs within the servers 101-103 for conventional networking. As a result, TCP offload techniques have been proposed which include 1) moving the transport processing duties from the CPU down to a network adapter; 2) providing a mechanism for remote direct memory access (RDMA) operations, thus giving the network adapter the ability to transfer data directly to/from application memory without requiring memory copies; and 3) providing a user-level direct access technique that allows an application to directly command the network adapter to send/receive data thereby bypassing the underlying operating system.

As noted in the background the developments associated with INFINIBAND provided the mechanisms for performing TCP offload and RDMA through the use of verbs and associated RDMA-enabled network adapters. But the RDMA-enabled network adapters associated with INFINIBAND employed INFINIBAND-specific networking protocols down to the physical layer which were not embraced by the networking community.

Yet, the networking community has endeavored to preserve the advantageous features of INFINIBAND while exploiting the existing investments that they have made in TCP/IP infrastructure. As mentioned earlier, the RDMA Consortium has produced standards for performing RDMA operations over standard TCP/IP networks, and while these standards do not specify a particular physical layer, it is anticipated that Ethernet will be widely used, most likely 10 Gb Ethernet, primarily because of the tremendous base of knowledge of this protocol that is already present within the community.

The present inventors have noted the need for RDMA over TCP, and have furthermore recognized the need to provide this capability over Ethernet fabrics. Therefore, the present invention described hereinbelow is provided to enable effective and efficient RDMA operations over a TCP/IP/Ethernet network.

Figure 2:
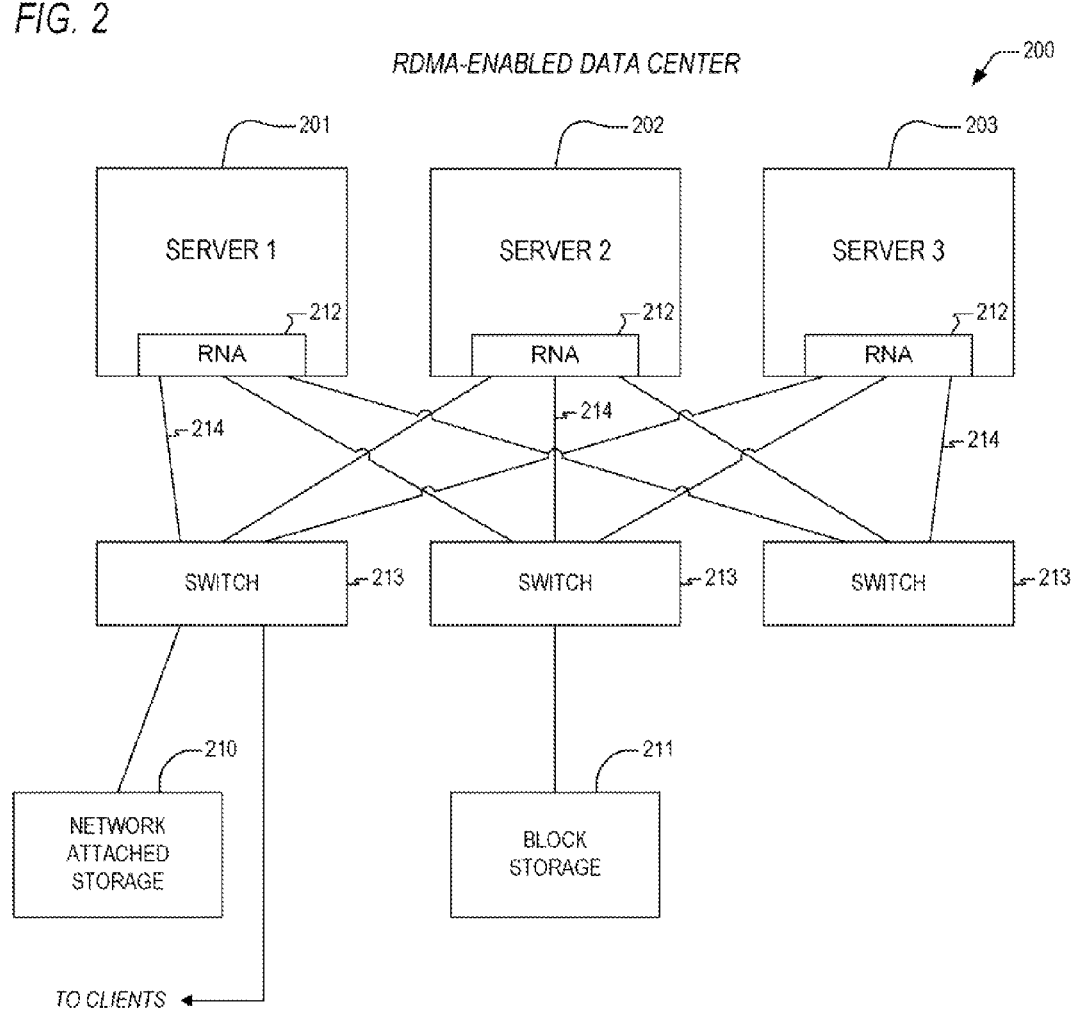
FIG. 2 is a block diagram featuring a data center according to the present invention that provides a LAN, SAN, and cluster over an RDMA-enabled TCP/IP Ethernet fabric.

Now turning to FIG. 2, a block diagram featuring a multi-server configuration 200 within an exemplary data center according to the present invention that provides a LAN, SAN, and cluster over an RDMA-enabled TCP/IP Ethernet fabric that interconnects three servers 201-203 and that provides for a LAN, a SAN, and a cluster network. The servers 201-203 are interconnected over the LAN to clients and to network attached storage (NAS) 210 via a LAN fabric that consists of multiple point-to-point TCP/IP/Ethernet links 214 that are interconnected via one or more Ethernet switches 213 (or IP routers 213). The servers 201-203 each connect up to the LAN via an RDMA-enabled network adapter 212. Like the multi-server configuration 100 of FIG. 1, the configuration 200 of FIG. 2 utilizes TCP/IP over Ethernet as the LAN networking protocol. In one embodiment, the RDMA-enabled network adapter 212 is capable of accelerating a conventional TCP/IP stack and sockets connection by intercepting a conventional socket SEND command and performing RDMA operations to complete a requested data transfer. In an alternative embodiment, the RDMA-enabled network adapter 212 also supports communications via the conventional TCP/IP stack. The servers 201-203 are also interconnected over the SAN to one or more block storage devices 211 via a SAN fabric that consists of multiple point-to-point SAN links 214 that are interconnected via one or more Ethernet switches 213. In contrast to the configuration 100 of FIG. 1, the servers 201-203 each connect up to the SAN via the same RDMA-enabled network adapter 212 as is employed to connect up to the LAN. Rather than using Fibre Channel as the networking protocol, the SAN employs TCP/IP/Ethernet as the underlying networking protocol and may employ Internet SCSI (iSCSI) as an upper layer protocol (ULP) to enable transport of data to/from the block storage 211. In one embodiment, the RDMA-enabled network adapter 212 is capable of performing RDMA operations over a TCP/IP/Ethernet fabric responsive to iSCSI commands. The servers 201-203 are additionally interconnected over the cluster network to each other to allow for high performance computing applications as noted above. The cluster network consists of multiple point-to-point cluster links 214 that are interconnected via one or more Ethernet switches 213. The servers 201-203 each connect up to the duster network via the same RDMA-enabled network adapter 212 as is used to connect to the LAN and SAN. For clustering applications, the verbs interface is used with the RDMA-enabled network adapter 212 over the TCP/IP/Ethernet fabric to enable low latency transfer of data over the clustering network.

Although a separate LAN, SAN, and cluster network are depicted in the RDMA-enabled multi-server configuration 200 according to the present invention, the present inventors also contemplate a single fabric over which LAN data, SAN data, and cluster network data are commingled and commonly switched. Various other embodiments are encompassed as well to include a commingled LAN and SAN, with a conventional duster network that may employ separate switches (not shown) and cluster network adapters (not shown). In an embodiment that exhibits maximum commonality and lowest overall cost of ownership, data transactions for LAN, SAN, and cluster traffic are initiated via execution of RDMA over TCP verbs by application programs executing on the servers 201-203, and completion of the transactions are accomplished via the RDMA-enabled network adapters over the TCP/IP/Ethernet fabric. The present invention also contemplates embodiments that do not employ verbs to initiate data transfers, but which employ the RDMA-enabled adapter to complete the transfers across the TCP/IP/Ethernet fabric, via RDMA or other mechanisms.

Figure 3:
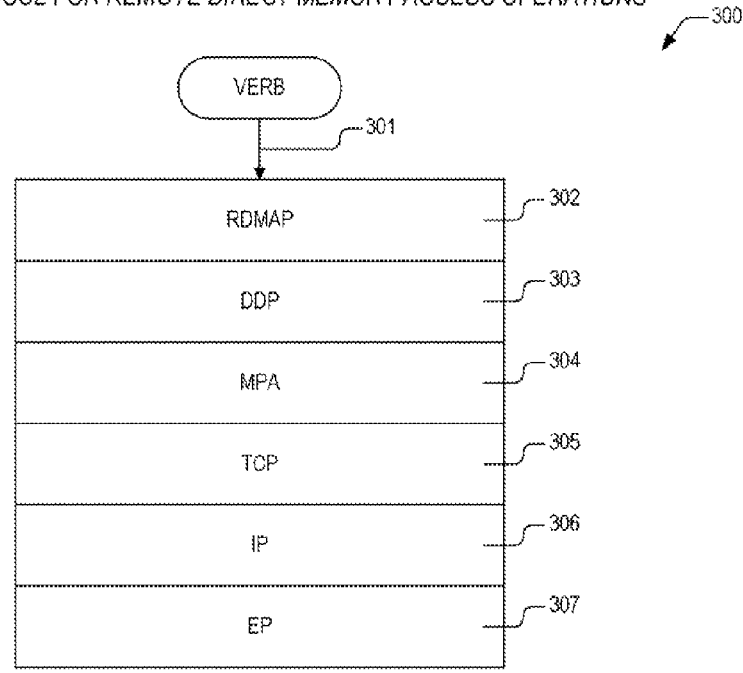
FIG. 3 is a block diagram showing a layered protocol for accomplishing remote direct memory access operations according to the present invention over a TCP/IP Ethernet fabric.

Now turning to FIG. 3, a block diagram 300 is presented showing an exemplary layered protocol for accomplishing remote direct memory access operations according to the present invention over a TCP/IP Ethernet fabric. The exemplary layered protocol employs an verbs interface 301, an RDMA protocol layer 302, a direct data placement (DDP) layer 303, a marker PDU alignment layer 304, a conventional TCP layer 305, a conventional IP layer 306, and a conventional Ethernet layer 307.

In operation, a program executing on a server at either the user-level or kernel level initiates a data transfer operation by executing a verb as defined by a corresponding upper layer protocol (ULP), in one embodiment, the verbs interface 301 is defined by the aforementioned "RDMA Protocol Verbs Specification," provided by the RDMA Consortium, and which is hereinafter referred to as the Verbs Specification. The Verbs Specification refers to an application executing verbs as defined therein as a "consumer." The mechanism established for a consumer to request that a data transfer be performed by an RDMA-enabled network adapter according to the present invention is known as a queue pair (QP), consisting of a send queue and a receive queue. In addition, completion queue(s) may be associated with the send queue and receive queue. Queue pairs are typically areas of host memory that are setup, managed, and torn down by privileged resources (e.g., kernel thread) executing on a particular server, and the Verbs Specification describes numerous verbs which are beyond the scope of the present discussion that are employed by the privileged resources for management of queue pairs. Once a queue pair is established and assigned, a program operating at the user privilege level is allowed to bypass the operating system and request that data be sent and received by issuing a "work request" to a particular queue pair. The particular queue pair is associated with a corresponding queue pair that may be executing on a different server, or on the same server, and the RDMA-enabled network adapter accomplishes transfer of data specified by posted work requests via direct memory access (DMA) operations. In a typical embodiment, interface between memory control logic on a server and DMA engines in a corresponding RDMA-enabled network adapter according to the present invention is accomplished by issuing commands over a bus that supports DMA. In one embodiment, a PCI-X interface bus is employed to accomplish the DMA operations. In an alternative embodiment, interface is via a PCI Express bus. Other host bus protocols are contemplated as well.

Work requests are issued over the verbs interface 301 when a consumer executes verbs such as PostSQ (Post Work Request to Send Queue (SQ)) and PostRQ (Post Work Request to Receive Queue (RQ)). Each work request is assigned a work request H) which provides a means for tracking execution and completion. A PostSQ verb is executed to request data send, RDMA read, and RDMA write operations. A PostRQ verb is executed to specify a scatter/gather list that describes how received data is to be placed in host memory. In addition to the scatter/gather list, a PostRQ verb also specifies a handle that identifies a queue pair having a receive queue that corresponds to the specified scatter/gather list. A Poll for Completion verb is executed to poll a specified completion queue for indications of completion of previously specified work requests.

The issuance of a work request via the verbs interface by a consumer results in the creation of a work queue element (WQE) within a specified work queue (WQ) in host memory. Via, an adapter driver and data stores, also in host memory, creation of the WQE is detected and the WQE is processed to effect a requested data transfer.

Once a SQ WQE is posted, a data transfer message is created by the network adapter at the RDMAP layer 302 that specifies, among other things, the type of requested data transfer (e.g., send, RDMA read request, RDMA read response. RDMA write) and message length, if applicable. WQEs posted to an RQ do not cause an immediate transfer of data. Rather, RQ WQEs are preposted buffers that are waiting for inbound traffic.

The DDP layer 303 lies between the RDMAP layer 302 and the MPA layer 304. Within the DDP layer 303, data from a ULP (i.e., a "DDP message") is segmented into a series of DDP segments, each containing a header and a payload. The size of the DDP segments is a function of the TCP Maximum Segment Size (MSS), which depends on the IP/link-layer Maximum Transmission Unit (MTU). The header at the DDP layer 303 specifies many things, the most important of which are fields which allow the direct placement into host memory of each DDP segment, regardless of the order in TCP sequence space of its arrival. There are two direct placement models supported, tagged and untagged. Tagged placement causes the DDP segment to be placed into a pre-negotiated buffer specified by an STag, field (a type of buffer handle) and TO field (offset into the buffer identified by the STag field). Tagged placement is typically used with RDMA read and RDMA write messages. Untagged placement causes the DDP segment to be placed into a buffer that was not pre-negotiated, but instead was pre-posted by the receiving adapter onto one of several possible buffer queues. There are various fields in the DDP segment that allow the proper pre-posted buffer to be filled, including: a queue number that identifies a buffer queue at the receiver ("sink"), a message sequence number that uniquely identifies each untagged DDP message within the scope of its buffer queue number (i.e., it identifies which entry on the buffer queue this DDP segment belongs to), and a message offset that specifies where in the specified buffer queue entry to place this DDP segment. Note that the aforementioned queue number in the header at the DDP layer 303 does not correspond to the queue pair (QP) that identifies the connection. The DDP header also includes a field (i.e., the last flag) that explicitly defines the end of each DDP message.

As noted above, received DDP segments may be placed when received out of order, but their corresponding messages must be delivered in order to the ULP. In addition, the fields within untagged RDMA messages (e.g., queue number, message sequence number, message offset, and the last flag) allow an RDMA-enabled network adapter to uniquely identify a message that corresponds to a received DDP segment. This information is needed to correctly report completions. But observe that tagged RDMA messages (e.g., RDMA Read Response, RDMA Write) do not provide such fields. All that are provided for tagged RDMA messages are the STag field and TO field. Consequently, without additional information, it is impossible to track and report delivery of untagged RDMA messages in order to the ULP. The present invention addresses this limitation and provides apparatus and methods for in-order tracking and delivery of untagged RDMA messages, as will be described in further detail below.

The MPA layer 304 is a protocol that frames an upper layer protocol data unit (PDU) to preserve its message record boundaries when transmitted over a reliable TCP stream and to add message-level error checking provisions in the form of a 32-bit MPA CRC. The MPA layer 304 produces framed PDUs (FPDUs). The MPA layer 304 creates an FPDU by pre-pending an MPA header, inserting MPA markers into the PDU at 512 octet periodic intervals in TCP sequence number space if required, post-pending a pad set to zeros to the PDU to make the size of the FPDU an integral multiple of four, and adding the aforementioned 32-bit cyclic redundancy check (CRC) that is used to verify the contents of the FPDU. The MPA header is a 16-bit value that indicates the number of octets in the contained PDU. The MPA marker includes a 16-bit relative pointer that indicates the number of octets in the TCP stream from the beginning of the FPDU to the first octet of the MPA marker. MPA markers are provided to allow for placement of data that is received out of order. Because the MPA markers occur in the TCP byte stream at regular intervals, a receiving RDMA-enabled network adapter is provided with a means for locating the MPA header, and thus is enabled to determine when a message has been completely received.

FPDUs are provided to the conventional TCP layer 305, which provides for reliable transmission of a stream of bytes over the established connection. This layer 305 divides FPDUs into TCP segments and prepends a TCP header which indicates source and destination TCP ports along with a TCP segment octet sequence number. In other words, the TCP segment octet sequence number is not a count of TCP segments; it is a count of octets transferred.

TCP segments are passed to the IP layer 306. The IP layer 306 encapsulates the TCP segments into IP datagrams having a header that indicates source and destination IP addresses.

Finally, the IP datagrams are passed to the Ethernet layer 307, which encapsulates the IP datagrams into Ethernet frames, assigning a source and destination media access control (MAC) address to each, and post-pending a CRC to each frame.

One skilled in the art will appreciate that layers 305-307 represent conventional transmission of a stream of data over a reliable TCP/IP/Ethernet connection. Framing for preservation of ULPDU boundaries is provided for by the MPA layer 304. And direct placement of data via DMA is handled by an RDMA-enabled network adapter according to the present invention in accordance with verbs interface 301 and layers 302-303 as they interact with a consumer through an established work queue. It is noted that the information prepended and inserted by layers 302-304 is essential to determining when transmission of data associated with an RDMA operation (e.g., send, RDMA read, RDMA write) is complete. An RDMA-enabled network adapter that is employed in any practical implementation, to include LANs, SANs, and clusters that utilizes 10 Gb links must be capable of making such determination and must furthermore be capable of handling retransmission of TCP segments in the case of errors with minimum latency. One skilled in the art will appreciate that since the boundaries of an RDMA message are derived from parameters stored in a Work Queue in host memory, the host memory typically must be accessed in order to determine these boundaries. The present inventors recognize this unacceptable limitation of present day configurations and have provided, as will be described in more detail below, apparatus and methods for maintaining a local subset of the parameters provided in a work queue that are essential for retransmission in the event of network errors and for determining when a requested RDMA operation has been completed so that a completion queue entry can be posted in a corresponding completion queue.

The present inventors also have observed that there are a number of problems associated with the placement and removal of MPA markers within a TCP byte stream which must be overcome in order for an RDMA-enabled network adapter to efficiently operate at speeds commensurate with 10 Gb/sec Ethernet links. For example, as will be addressed in more detail below, it is appreciated that TCP is a byte stream protocol which is not required to preserve TCP segment boundaries. Rather, TCP allows for resegmentation of a TCP segment into a plurality of TCP segments, and also allows for resegmentation of a TCP segment into fewer TCP segments. Such resegmentation consequently may result in TCP segments that are not aligned upon PDU boundaries, as would be desirable from a processing perspective, particularly with regard to the placement and removal of MPA markers. Consequently, the present inventors have observed that an RDMA-enabled network adapter must be capable of functioning efficiently under the above-noted conditions, particularly where a ULP PDU is received in more than one TCP segment and where the PDU header does not, immediately follow the TCP header. Furthermore, the present inventors have noted that an RDMA-enabled network adapter must also be capable of efficiently processing multiple ULP PDUs that have been combined into a single TCP segment.

Figure 4:
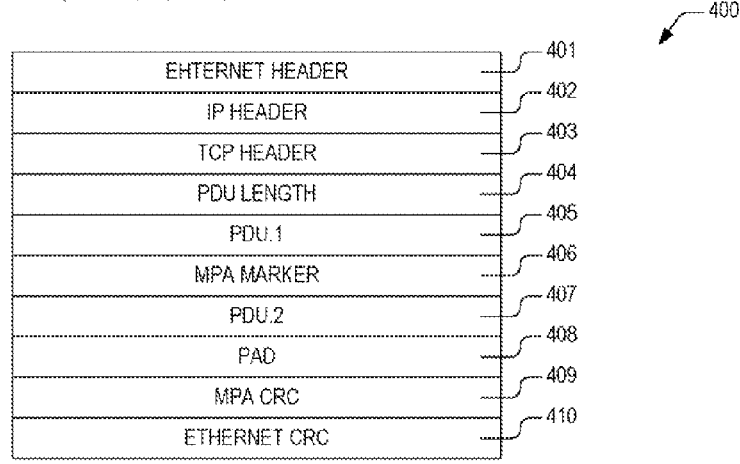
FIG. 4 is a block diagram depicting placement of an MPA header, MPA marker, and MPA CRC within an Ethernet frame according to the present invention.

Now referring to FIG. 4, a block diagram is presented depicting placement of an MPA header 404, MPA marker 406, and MPA CRC 409 within an Ethernet frame 400 according to the present invention. As noted in the discussion above with reference to FIG. 3, the DDP layer 303 passes down a PDU to the MPA layer 304, where the PDU consists of a DDP header and DDP payload. The MPA layer 304 adds an MPA header 404 to the PDU indicating its length and is also required to insert an MPA marker 406 every 512 octets in the TCP sequence space that includes a 16-bit relative pointer that indicates the number of octets in the TCP stream from the beginning of the FPDU to the first octet of the MPA marker 406. Thus, the example of FIG. 4 shows an MPA marker 406 inserted within a single PDU, thus dividing the PDU into two parts: a first part PDU.1 405 prior to the marker 406, and a second part PDU.2 407 following the marker 406. In addition, the MPA layer 304 appends an MPA pad 408 and MPA CRC 409 as described above to form an FPDU comprising items 404-409. The TCP layer 305 adds a TCP header as described above to form a TCP segment comprising fields 403-409. The IP layer 306 adds an IP header 402 as described above to form an IP datagram comprising fields 402-409. And finally, the Ethernet layer adds an Ethernet header 401 and Ethernet CRC 410 to form an Ethernet frame 400 comprising fields 401-410.

According to the protocol specifications noted above, the MPA marker 406 points some number of octets within a given TCP stream back to an octet which is designated as the beginning octet of an associated FPDU. If the maximum segment size (MSS) for transmission over the network is changed due to error or due to dynamic reconfiguration, and if an RDMA-enabled adapter is required to retransmit a portion of TCP segments wing this changed MSS, the RDMA-enabled network adapter must rebuild or otherwise recreate all of the headers and markers within an FPDU so that they are in the exact same places in the TCP sequence space as they were in the original FPDU which was transmitted prior to reconfiguration of the network. This requires at least two pieces of information: the new changed MSS and the MSS in effect when the FPDU was first transmitted. An MSS change will cause the adapter to start creating never-transmitted segments using the new MSS. In addition, the adapter must rebuild previously transmitted PDUs if it is triggered to do so, for example, by, a transport timeout. In addition to parameters required to correctly recreate MPA FPDUs, one skilled in the art will appreciate that other parameters essential for rebuilding a PDU include the message sequence number (e.g., Send MSN and/or Read MSN) assigned by the DDP layer 303, the starting TCP sequence number for the PDU, and the final TCP sequence number for the PDU. Most conventional schemes for performing retransmission maintain a retransmission queue which contains parameters associated with PDUs that have been transmitted by a TCP/IP stack, but which have not been acknowledged. The queue is typically embodied as a linked list and when retransmission is required, the linked list must be scanned to determine what portion of the PDUs are to be retransmitted. A typical linked list is very long and consists of many entries. This is because each of the entries corresponds to an Ethernet packet. Furthermore, the linked list must be scanned in order to process acknowledged TCP segments for purposes of generating completion queue entries. In addition, for RDMA over TCP operations, the specifications require that completion queue entries be developed on a message basis. And because TCP is a streaming protocol, the data that is required to determine message completions must be obtained from the upper layers 301-304. The present inventors have noted that such an implementation is disadvantageous as Ethernet speeds are approaching 10 Gb/second because of the latencies associated with either accessing a work queue element in host memory over a PCI bus or because of the latencies associated with scanning a very long linked list. In contrast, the present invention provides a superior technique for tracking information for processing of retransmissions and completions at the message level (as opposed to packet-level), thereby eliminating the latencies associated with scanning very long linked lists.

In addition to the above-noted challenges, the present inventors have also observed other challenges that must be overcome when implementing a multi-gigabit network transport layer according to the protocol conventions of FIG. 4. One such difficulty, as alluded to above, is providing an efficient and effective mechanism for the location, placement, and removal of MPA markers under 10 Gb/sec link conditions. For a 1460-byte TCP segment, two or three MPA markers must be inserted or removed. But for a 9K jumbo packet, there could be approximately 18 markers that must be inserted or removed. Consequently, a straightforward solution which performs a sequence of copy operations from one buffer to a next buffer within an adapter to insert/remove MPA marker is unacceptable at 10 Gb/sec link speeds because of the latencies and performance issues that are associated with the copy operations. A variation on the buffer technique above would eliminate an intermediate set of internal buffers in the adapter and instead perform the copy operations directly to host memory. That is, once the adapter has completed ULP protocol processing on a received packet to locate headers and validate the packet, it would perform a series of 508-byte write operations to host memory to place the data without markers. Similarly, 508-byte read operations would be required to retrieve the data from memory and place MPA markers therein before storing the data to internal buffers within the adapter. But, as one skilled in the art will appreciate, approximately 19 506-byte read requests would be required just to build one 9K jumbo packet. Issuing such a large number of read requests just to build one packet is limiting because of the issues associated with processing a large number of read responses that may be received out of order, the limitations of today's server chipsets (most do not support up to 19 outstanding read requests), and the memory transfer inefficiencies that arise from providing 508-byte requests to memory controllers that are optimized for 64-byte cache line quantized transfers. Clearly, MPA marker insertion and removal is an issue that must be addressed when operating an RDMA-enabled network adapter over 10 Gb/sec links. And the present invention addresses these issues, and limitations of the present state of the art, as will be described in further detail below.

A further challenge involves the difficulty associated with calculation and validation of the MPA CRC 409. The diagram of FIG. 4 depicts what is known as an "aligned" FPDU within the Ethernet frame 400. The FPDU is aligned because the PDU length field 404 (also called an MPA header 404) immediately follows the TCP header 403 and the MPA CRC field 409 is within the same frame 400 as the PDU to which it corresponds. Such a configuration is highly desirable from the standpoint of an RDMA-enabled network for purposes of computing a CRC of the corresponding FPDU because all of the information (i.e. the MPA header and MPA CRC) that is required for computation of the CRC is resident within the received frame 400 itself. Because the PDU is aligned within, the received frame 400, an RDMA-enabled network adapter can immediately locate the length of the PDU 404 (it directly follows the TCP header 403), and from the length field 404, the adapter can determine the TCP sequence number of the MPA CRC field 409. Thus, the adapter can calculate a running CRC of the FPDU within the frame 400 for comparison therewith. The state (i.e., the location within TCP sequence space of MPA markers 406, which allows determination of the starting TCP sequence number of the FPDU) is required in order to recognize PDU boundaries within a TCP byte stream, and to enable PDUs that can span multiple TCP segments. And because any practical adapter must support a number of TCP connections, the state must be maintained for each one of the TCP connections. In addition, to support optimal performance of the adapter, the state information must be available in real-time as TCP segments arrive. Yet, providing the state for a number of TCP connections in real-time state availability can be very challenging at high link speeds, due in part to the fact that correlating an inbound TCP segment to its connection number can require complex and time consuming pattern matching, which can keep state information from being known in time to start a CRC calculation. The present inventors have further noted that it would be advantageous from a performance perspective to perform MPA CRC checks while receiving a PDU so a separate pass through the data would not otherwise be required and additional latency would not be added to PDU processing. The present invention contemplates an RDMA-enabled network adapter with MPA CRC capabilities which meets these requirements.

In more particular terms, in order to perform ULP CRC calculations (e.g., FPDU CRCs) on data which is received over a byte stream transport like TCP, it is required to have access to various state variables such as the starting octet (e.g., TCP sequence number) of an FPDU and the location within TCP sequence space of MPA markers 406 in order to validate a corresponding MPA CRC 409. But, as one skilled in the art will agree, TCP is a byte stream oriented protocol which is not required to preserve the TCP segment boundaries. For example, it is allowable within TCP to combine TCP segments in order to improve bandwidth utilization of a connection. By combining TCP segments, bandwidth is improved because there are fewer Ethernet 401, IP 402, and TCP headers 403. In addition, it is also permissible to resegment a TCP segment, that is, to break a single TCP segment up into two or more TCP segments. Consequently, while aligned FPDUs are desired by a ULP such as MPA, because combination and resegmentation are allowed under TCP, the result often is unaligned FPDUs that are received, which are difficult to process in terms of CRC computations for purposes of validating a ULP CRC. This is because the aforementioned state information (i.e., the location within TCP sequence space of MPA markers 406, which allows determination of the starting TCP sequence number of the FPDU) is not known when a packet is received.

Yet, an RDMA-enabled network adapter must be able to compute and validate CRCs for the case where a ULP PDU is segmented, and thus arrives in more than one TCP segment. In addition, the RDMA-enabled network adapter must also be able to compute and validate CRCs for the case where TCP has combined smaller ULP PDUs into a single TCP segment. This packing of ULP PDUs into a single TCP segment further complicates the CRC validation process because multiple checks need to now be performed per TCP segment. All of these factors complicate performing MPA CRC checks as TCP segments arrive. The present invention addresses these issues and furthermore provides a mechanism for speculatively computing ULP CRCs based upon the premise that it is highly probable to receive aligned FPDUs. Accordingly, the present invention presumes that all received frames 400 contained aligned FPDUs therein. Thus, the present invention provides for calculation and validation of MPA CRCs at the frame level, conditioned upon the actual configuration of the frame 400. Three different speculative CRCs are calculated as the frame is received: one CRC presumes MPA markers 406 are not enabled on the connection, another CRC presumes a minimum number of markers 406 are present within the frame 400, and a third CRC presumes a maximum number of markers 406 are present within the frame 400. The speculative CRCs are computed concurrent with receipt of the frame 400. If later processing of the FPDU determines that the frame 400 is indeed aligned, then an appropriate one of the CRCs is employed to validate the MPA CRC 409. If later processing indicates that the frame 400 is not aligned (as a result of segment combining, resegmentation, or other causes), then the speculative CRCs are discarded and an actual CRC is generated and validated once the entire FPDU has been received, thus adding latency to the flow. However, the probable case is that FPDUs will be aligned, and by generating these speculative CRCs and validating MPA CRCs based upon their presumed location in a received frame 400, the present invention eliminates most of the latencies associated with MPA CRC error checks that would otherwise be incurred in an RDMA-enabled network adapter.

Figure 5:
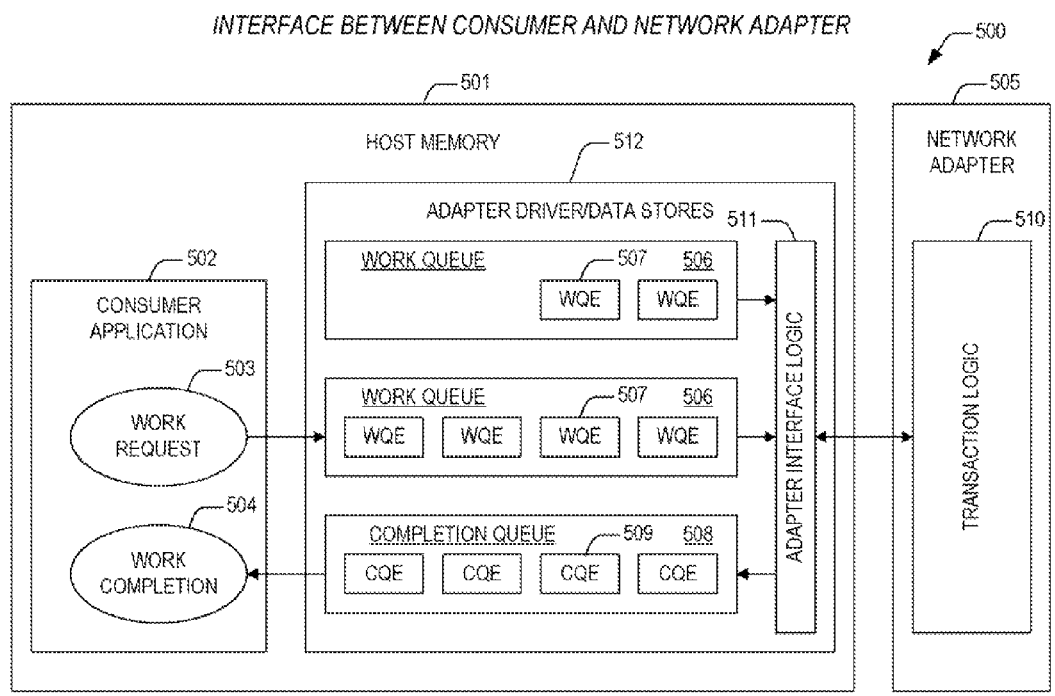
FIG. 5 is a block diagram illustrating the interface between a consumer application in host memory and a network adapter according to the present invention.

To further illustrate features and advantages of the present invention, attention is now directed to FIG. 5, which is a block diagram 500 illustrating interface between a consumer application 502 in host memory 501 and an RDMA-enabled network adapter 505 according to the present invention. The block diagram 500 illustrates the employment of work queues 506 according to the present invention disposed within adapter driver/data stores 512 to support RDMA over TCP operations. The adapter driver/data stores 512 is disposed within the host memory 501 and maintains the work queues 506 and provides for communication with the network adapter 505 via adapter interface logic 511. A work queue 506 is either a send queue or a receive queue. As alluded to above in the discussion with reference to FIG. 3, a work queue 506 is the mechanism through which a consumer application 502 provides instructions that cause data to be transferred between the application's memory and another application's memory. The diagram 500 depicts a consumer 502 within host memory 501. A consumer 502 may have one or more corresponding work queues 506, with a corresponding completion queue 508. Completion queues 508 may be shared between work queues 506. For clarity, the diagram 500 depicts only the send queue (SQ) portion 506 of a work queue pair that consists of both a send queue 506 and a receive queue (not shown). The completion queue 508 is the mechanism through which a consumer 502 receives confirmation that the requested RDMA over TCP operations have been accomplished and, as alluded to above, completion of the requested operations must be reported in the order that they were requested. Transaction logic 510 within the network adapter 505 is coupled to each of the work queues 506 and the completion queue 508 via the adapter driver logic 511.

The present inventors note that the network adapter 505 according to the present invention can be embodied as a plug-in module, one or more integrated circuits disposed on a blade server, or as circuits within a memory hub/controller. It is further noted that the present invention comprehends a network adapter 505 having work queues 506 disposed in host memory 501 and having transaction logic 510 coupled to the host memory 501 via a host interface such as PCI-X or PCI-Express. It is moreover noted that the present invention comprehends a network adapter 505 comprising numerous work queue pairs. In one embodiment, the network adapter 505 comprises a maximum of 256K work queue pairs.

RDMA over TCP operations are invoked by a consumer 502 through the generation of a work request 503. The consumer 502 receives confirmation that an RDMA over TCP operation has been completed by receipt of a work completion 504. Work requests 503 and work completions 504 are generated and received via the execution of verbs as described in the above noted Verb Specification. Verbs are analogous to socket calls that are executed in a TCP/IP-based architecture. To direct the transfer of data from consumer memory 501, the consumer 502 executes a work request verb that causes a work request 503 to be provided to the adapter driver/data stores 512. The adapter driver/data stores 512 receives the work request 503 and places a corresponding work queue element 507 within the work queue 506 that is designated by the work request 503. The adapter interface logic 511 communicates with the network adapter 505 to cause the requested work to be initiated. The transaction logic 510 executes work queue elements 507 in the order that they are provided to a work queue 506 resulting in transactions over the TCP/IP/Ethernet fabric (not shown) to accomplish the requested operations. As operations are completed, the transaction logic 510 places completion queue elements 509 on completion queues 508 that correspond to the completed operations. The completion queue elements 509 are thus provided to corresponding consumers 502 in the form of a work completion 504 through the verbs interface. It is furthermore noted that a work completion 504 can only be generated after TCP acknowledgement of the last byte within TCP sequence space corresponding to the given RDMA operation has been received by the network adapter 505.

FIG. 5 provides a high-level representation of queue structures 506, 508 corresponding to the present invention to illustrate how RDMA over TCP operations are performed from the point of view of a consumer application 502. At a more detailed level, FIG. 6 is presented to highlight how operations occur at selected layers noted in FIG. 3 to accomplish movement of data according to the present invention between two servers over a TCP/IP Ethernet network.

Figure 6:
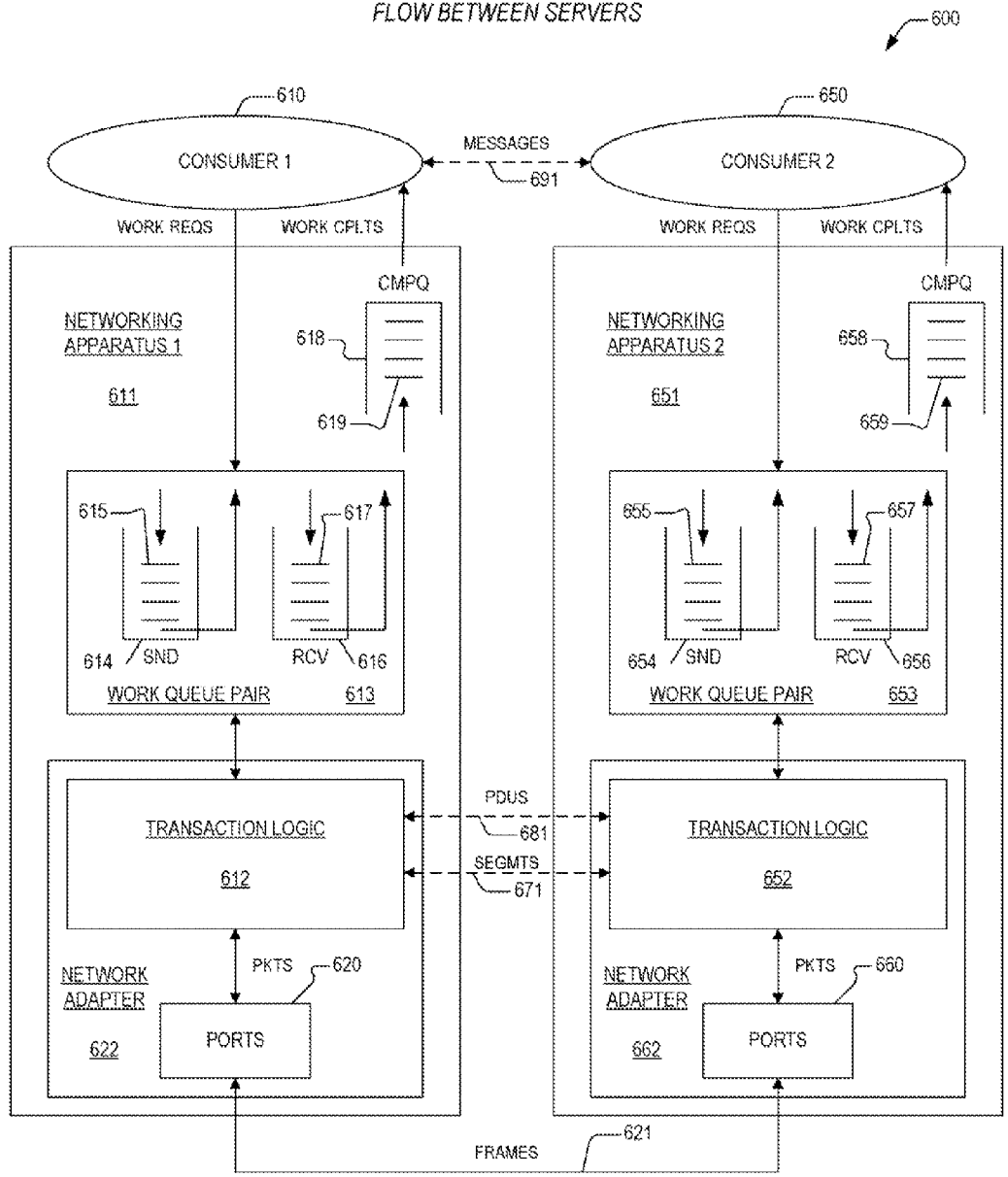
FIG. 6 is a block, diagram highlighting how operations occur at selected layers noted in FIG. 3 to accomplish movement of data according to the present invention between two servers over a TCP/IP Ethernet network.

Turning to FIG. 6, a block diagram 600 is presented showing two consumers 610, 650 communicating over an RDMA-enabled TCP/IP/Ethernet interface. The diagram 600 shows a first consumer application 610 coupled to a first networking apparatus 611 within a first server according to the present invention that is interfaced over an RDMA-enabled TCP/IP/Ethernet fabric to a counterpart second consumer application 650 coupled to a second networking apparatus 651 within a second server according to the present invention. The first consumer 610 issues work requests and receives work completions to/from the first networking apparatus 611. The second consumer 650 issues work requests and receives work completions to/from the second networking apparatus 651. For the accomplishment of RDMA over TCP operations between the two consumers 610, 650, each of the networking apparatuses 611, 651 have established a corresponding set of work queue pairs 613, 653 through which work queue elements 615, 617, 655, 657 will be generated to transfer data to/from first host memory in the first server from/to second host memory in the second server in the form of RDMA messages 691. Each of the work queue pairs 613, 653 has a send queue 614, 654 and a receive queue 616, 656. The send queues 614, 654 contain send queue elements 615, 655 that direct RDMA over TCP operations to be transacted with the corresponding work queue pair 653, 613. The receive queues 616, 656 contain receive queue elements 617, 657 that specify memory locations (e.g., scatter/gather lists) to which data received from a corresponding consumer 610, 650 is stored. Each of the networking apparatuses 611, 651 provide work completions to their respective consumers 610, 650 via one or more completion queues 618, 658. The work completions are provided as completion queue elements 619, 659. Each of the work queue pairs 613, 653 within the networking apparatuses 611, 651 are interfaced to respective transaction logic 612, 652 within an RDMA-enabled network adapter 622, 662 according to the present invention. The transaction logic 612, 652 processes the work queue elements 615, 617, 655, 657. For send queue work queue elements 615, 655 that direct transmission of PDUs 681, the transaction logic 612, 652 generates PDUs 681, lower level FPDUs, TCP segments 671, IP datagrams (or "packets"), and Ethernet frames, and provides the frames to a corresponding Ethernet port 620, 660 on the network adapter 622, 662. The ports 620, 660 transmit the frames over a corresponding Ethernet link 621. It is noted that any number of switches (not shown), routers (not shown), and Ethernet links 621 may be embodied as shown by the single Ethernet link 621 to accomplish routing of packets in accordance with the timing and latency requirements of the given network.

In an architectural sense. FIG. 6 depicts how all layers of an RDMA over TCP operation according to the present invention are provided for by RDMA-aware consumers 610, 650 and networking apparatus 611, 651 according to the present invention. This is in stark contrast to a convention TCP/IP stack that relies exclusively on the processing resources of a server's CPU. Ethernet frames are transmitted over Ethernet links 621. Data link layer processing is accomplished via ports 620, 610 within the network adapters 622, 662. Transaction logic 612, 652 ensures that IP packets are routed (i.e., network layer) to their proper destination node and that TCP segments 671 are reliably delivered. In addition, the transaction logic 612, 652 ensures end-to-end reliable delivery of PDUs 681 and the consumers 610, 650 are notified of successful delivery through the employment of associated completion queues 618, 658. Operations directed in corresponding work queues 613, 653 result in data being moved to/from the host memories of the consumer applications 610, 650 connected via their corresponding queue pairs 613, 653.

Figure 7:
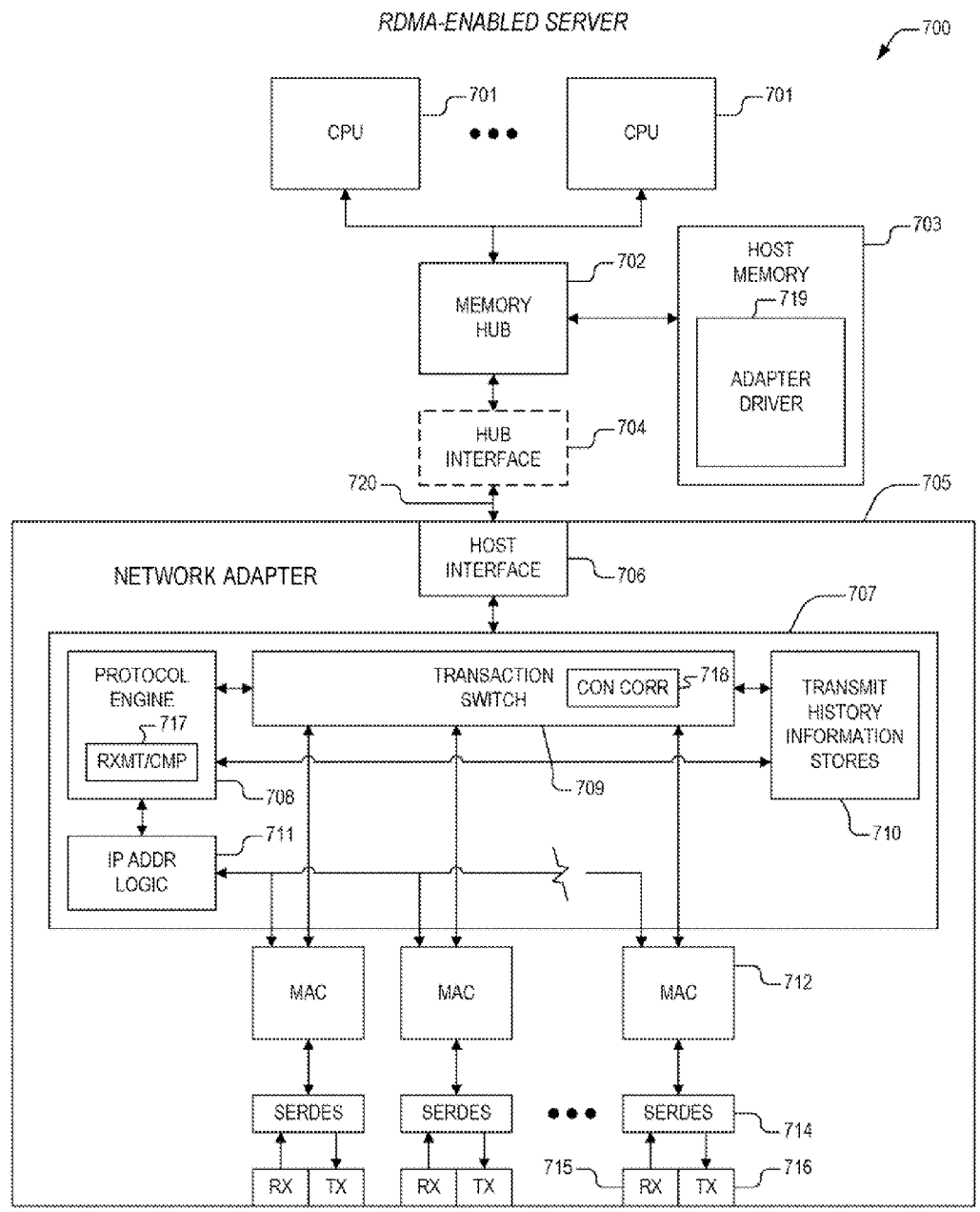
FIG. 7 is a block diagram of an RDMA-enabled server according to the present invention.

Referring to FIG. 7, a block diagram is presented of an RDMA-enabled server 700 according to the present invention. The server 700 has one or more CPUs 701 that are coupled to a memory hub 702. The memory hub 702 couples CPUs and direct memory access (DMA)-capable devices to host memory 703 (also known as system memory 703). An RDMA-enabled network adapter driver 719 is disposed within the host memory. The driver 719 provides for control, of and interface to an RDMA-enabled network adapter 705 according to the present invention. The memory hub 702 is also referred to as a memory controller 702 or chipset 702. Commands/responses are provided to/from the memory hub 702 via a host interface 720, including commands to control/manage the network adapter 705 and DMA commands/responses. In one embodiment, the host interface 720 is a PCI-X bus 720. In an alternative embodiment, the host interface 720 is a PCI Express link 720. Other types of host interfaces 720 are contemplated as well, provided they allow for rapid transfer of data to/from host memory 703. An optional hub interface 704 is depicted and it is noted that the present invention contemplates that such an interface 704 may be integrated into the memory hub 702 itself, that the hub interface 704 and memory hub 702 may be integrated into one or more of the CPUs 701. It is noted that the term "server" 700 is employed according to the present invention to connote a computer 700 comprising one or more CPUs 701 that are coupled to a memory hub 702. The server 700 according to the present invention is not to be restricted to meanings typically associated with computers that run server applications and which are typically located within a data center, although such embodiments of the present invention are clearly contemplated. But in addition, the server 700 according to the present invention also comprehends a computer 700 having one or more CPUs 701 that are coupled to a memory hub 702, which may comprise a desktop computer 700 or workstation 700, that is, computers 700 which are located outside of a data center and which may be executing client applications as well.

The network adapter 705 has host interface logic 706 that provides for communication to the memory hub 702 and to the driver 719 according to the protocol of the host interface 720. The network adapter 705 also has transaction logic 707 that communicates with the memory hub 702 and driver 719 via, the host interface logic. The transaction logic 707 is also coupled to one or more media access controllers (MAC) 712. In one embodiment, there are four MACs 712. In one embodiment, each of the MACs 712 is coupled to a serializer/deserializer (SERDES) 714, and each of the SERDES 714 are coupled to a port that comprises respective receive (RX) port 715 and respective transmit (TX) port 716. Alternative embodiments contemplate a network adapter 705 that does not include integrated SERDES 714 and ports. In one embodiment, each of the ports provides for communication of frames in accordance with 1 Gb/sec Ethernet standards. In an alternative embodiment, each of the ports provides for communication of frames in accordance with 10 Gb/sec Ethernet standards. In a further embodiment, one or more of the ports provides for communication of frames in accordance with 10 Gb/sec Ethernet standards, while the remaining ports provide for communication of frames in accordance with 1 Gb/sec Ethernet standards. Other protocols for transmission of frames are contemplated as well, to include Asynchronous Transfer Mode (ATM).

The transaction logic 707 includes a transaction switch 709 that is coupled to a protocol engine 708, to transmit history information stores 710, and to each of the MACs 712. The protocol engine includes retransmit/completion logic 717. The protocol engine is additionally coupled to IP address logic 711 and to the transmit history information stores 710. The IP address logic 711 is coupled also to each of the MACs 712. In addition, the transaction switch 709 includes connection correlation logic 718.

In operation, when a CPU 701 executes a verb as described herein to initiate a data transfer from the host memory 703 in the server 700 to second host memory (not shown) in a second device (not shown), the driver 719 is called to accomplish the data transfer. As alluded to above, it is assumed that privileged resources (not shown) have heretofore set up and allocated a work queue within the host memory 703 for the noted connection. Thus execution of the verb specifies the assigned work queue and furthermore provides a work request for transfer of the data that is entered as a work queue element into the assigned work queue as has been described with reference to FIGS. 5-6. Establishment of the work queue entry into the work queue triggers the driver 719 to direct the network adapter 705 via the host interface 720 to perform the requested data transfer. Information specified by the work queue element to include a work request ID, a steering tag (if applicable), a scatter/gather list (if applicable), and an operation type (e.g., send, RDMA read, RDMA write), along with the work queue number, are provided over the host interface 720 to the transaction logic 707. The above noted parameters are provided to the protocol engine 708, which schedules for execution the operations required to effect the data transfer through a transmit pipeline (not shown) therein. The protocol engine 708 schedules the work required to effect the data transfer, and in addition fills out an entry (not shown) in a corresponding transmit FIFO buffer (not shown) that is part of the transmit history information stores 710. The corresponding FIFO buffer is dynamically bound to the work queue which requested the data transfer and every bound FIFO buffer provides entries corresponding one-to-one with the entries in the work queue to which it is dynamically bound. In one embodiment, the transmit FIFO buffer is embodied as a memory that is local to the network adapter 705. Dynamic binding of FIFO buffers to work queues according to the present invention is extremely advantageous from the standpoint of efficient utilization of resources. For example, consider an embodiment comprising a 16 KB FIFO buffer. In a configuration that supports, say, 4K queue pairs, if dynamic binding were not present, then 64 MB of space would be required to provide for all of the queue pairs. But, as one skilled in the art will appreciate, it is not probable that all queue pairs will be transmitting simultaneously, so that a considerable reduction in logic is enabled by implementing dynamic binding. Upon allocation of the entry in the transmit FIFO buffer, parameters from the work queue element are copied thereto and maintained to provide for effective determination of completion of the data transfer and for rebuilding/retransmission of TCP segments in the event of network errors or dynamic reconfiguration. These parameters include, but are not limited to the work request ID and the steering tag. To effect the data transfer, the data specified in the work queue element is fetched to the network adapter 705 using DMA operations to host memory 703 via the host interface 720 to the memory controller 702. The data is provided to the transaction switch 709. The protocol engine 708 in conjunction with the transaction switch 709 generates all of the header, marker, CRC, and checksum fields described hereinabove for respective layers of the RDMA over TCP protocol and when PDUs, FPDUs, TCP segments, and IP datagrams are generated, parameters that are essential to a timely rebuild of the PDUs (e.g., MULPDU, the message sequence number, the starting and final TCP sequence numbers) are provided to the transmit history information stores 710 in the allocated entry in the transmit. FIFO buffer. In one embodiment, the connection correlation logic 718 within the transaction switch 709, for outgoing transmissions, provides an association (or "mapping") for a work queue number to a "quad." The quad includes TCP/IP routing parameters that include a source TCP port, destination. TCP port, a source IP address, and a destination IP address. Each queue pair has an associated connection context that directly defines all four of the above noted parameters to be used in outgoing packet transmissions. These routing parameters are employed to generate respective TCP and IP headers for transmission over the Ethernet fabric. In an alternative embodiment, the connection correlation logic 718, for outgoing transmissions, is disposed within the protocol engine 708 and employs IP addresses stored within the IP address logic 711. The Ethernet frames are provided by the transaction switch 709 to a selected MAC 712 for transmission over the Ethernet fabric. The configured Ethernet frames are provided to the SERDES 714 corresponding to the selected MAC 712. The SERDES 714 converts the Ethernet frames into physical symbols that are sent out to the link through the TX port 716. For inbound packets, the connection correlation logic 718 is disposed within the transaction switch 709 and provides a mapping of an inbound quad to a work queue number, which identifies the queue pair that is associated with the inbound data.

The IP address logic 711 contains a plurality of entries that are used as source IP addresses in transmitted messages, as alluded to above, in one embodiment, there are 32 entries. In addition, when an inbound datagram is received correctly through one of the MACs 712, the destination IP address of the datagram is compared to entries in the LP address logic 711. Only those destination IP addresses that match an entry in the IP address logic 711 are allowed to proceed further in the processing pipeline associated with RDMA-accelerated connections. As noted above, other embodiments of the present invention are contemplated that include use of an RDMA-enabled network adapter 705 to also process TCP/IP transactions using a conventional TCP/IP network stack in host memory. According to these embodiments, if an inbound packet's destination IP address does not match an entry in the IP address logic 711, then the packet is processed and delivered to the host according to the associated network protocol.

The protocol engine 708 includes retransmit/completion logic 717 that monitors acknowledgement of TCP segments which have been transmitted over the Ethernet fabric. If network errors occur which require that one or more segments be retransmitted, then the retransmit/completion logic 717 accesses the entry or entries in the corresponding transmit FIFO buffer to obtain the parameters that are required to rebuild and retransmit the TCP segments. The retransmitted TCP segments may consist of a partial FPDU under conditions where maximum segment size has been dynamically changed. It is noted that all of the parameters that are required to rebuild TCP segments associated for retransmission are stored in the associated transmit FIFO buffer entries in the transmit history information stores 710.

Furthermore, a final TCP sequence number for each generated message is stored in the entry so that when the final TCP sequence number has been acknowledged, then the protocol engine 708 will write a completion queue entry (if required) to a completion queue in host memory 703 that corresponds to the work queue element that directed the data transfer.

It is also noted that certain applications executing within the same server 700 may employ RDMA over TCP operations to transfer data. As such, the present invention also contemplates mechanisms whereby loopback within the transaction logic 707 is provided for along with corresponding completion acknowledgement via the parameters stored by the transmit history information stores 710.

Figure 8:
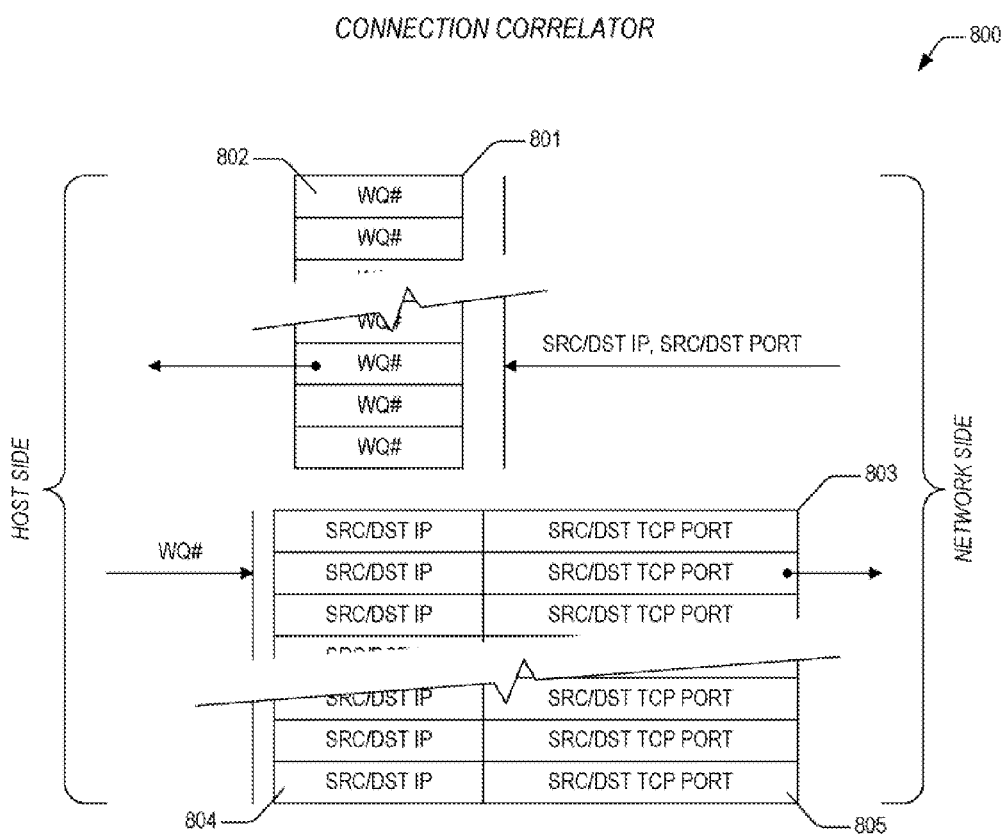
FIG. 8 is a block diagram featuring a connection correlator within the RDMA-enabled server of FIG. 7.

Now turning to FIG. 8, a block diagram is presented featuring an exemplary connection correlator 800 within the RDMA-enabled server 700 of FIG. 7. The block diagram shows a work queue-to-TCP map 803 and a TCP-to-work queue map 801. The TCP-to-work queue map 801 has one or more entries 802 that associate a "quad" retrieved from inbound IP datagrams with a corresponding work queue number. A quad consists of source and destination IP addresses and source and destination TCP ports. Thus, correlation between a quad and a work queue number, establishes a virtual connection between two RDMA-enabled devices. Thus, the payloads of received datagrams are mapped for processing and eventual transfer to an associated area of memory that is specified by a work queue element within the selected work queue number 802.

For outbound datagrams, the work queue-to-TCP map 803 has one or more entries 804, 805 that associate a work queue number with a corresponding quad that is to be employed when configuring the outbound datagrams. Accordingly, the outbound datagrams for associated FPDUs of a given work queue number are constructed using the selected quad.

The exemplary connection correlator 800 of FIG. 8 is provided to clearly teach correlation aspects of the present invention, and the present inventors note that implementation of the correlator 800 as a simple indexed table in memory as shown is quite impractical. Rather, in one embodiment, the TCP-to-work queue map 801 is disposed within a hashed, indexed, and linked list structure that is substantially similar in function to content addressable memory.

Referring to FIG. 9, a block diagram is presented showing details of transmit history information stores 900 within a network adapter according to the present invention. The transmit history information, stores 900 includes entry access logic 902 that is coupled to a plurality of transmit FIFO buffers 903. Each of the buffers 903 includes one or more entries 904 which are filled out by a protocol engine according to the present invention while processing work queue elements requiring transmission of data over the Ethernet fabric. In one embodiment, the transmit history information, stores 900 is a memory that is integrated within a network adapter according to the present invention. In an alternative embodiment, the transmit history information stores 900 is a memory that is accessed over a local memory bus (not shown). In this alternative embodiment, optional interface logic 901 provides for coupling of the entry access logic 902 to the local memory bus. In one embodiment, each buffer 903 comprises 16 Kilobytes which are dynamically bound to a queue pair when send queue elements exist on that pair for which there are to-be-transmitted or unacknowledged TCP segments. Each buffer 903 is temporarily hound to a queue pair as previously noted and each entry 904 is affiliated with a work queue element on the queue pair's send queue. In one embodiment, each buffer entry 904 comprises 32 bytes.

Now turning to FIG. 10, a block diagram is presented providing details of an exemplary transmit FIFO butter entry 1000 according to the present invention. The buffer entry includes the following fields: sendmsn 1001, readmsn 1002, startseqnum 1003, finalseqnum 1004, streammode 1005, sackpres 1006, mulpdu 1007 notifyoncomp 1008, stagtoinval 1009, workreqidlw 1010, workreqidhi 1011, and type 1012. The sendmsn field 1001 maintains the current 32-bit send message sequence number. The readmsn field 1002 maintains the current 32-bit read message sequence number. The startseqnum field 1003 maintains the initial TCP sequence number of the send queue element affiliated with the entry 1000 The startseqnum field 1003 is provided to the entry 1000 during creation of the first TCP segment of the message. The finalseqnum field 1004 maintains the final TCP sequence number of the message. The finalseqnum field 1004 is provided during creation of the of the first TCP segment of a message corresponding to a TCP offload engine (TOE) connection. For an RDMA message, the finalseqnum field 1004 is created when a DDP segment containing a last flag is sent. The streammode field 1005 maintains a 1-bit indication that TCP streaming mode is being employed to perform data transactions other than RDMA over TCP, for example, a TCP-offload operation. The sackpres field 1006 maintains a 1-bit indication that the mulpdu field 1007 has been reduced by allocation for a maximum sized SACK block. The mulpdu field 1007 maintains a size of the maximum upper level PDU that was in effect at the time of transmit. This field 1007 is used when TCP segments are being rebuilt in the event of network errors to re-segment FPDUs so that they can be reliably received by a counterpart network adapter. The notifyoncomp field 1008 indicates whether a completion queue element needs to be generated by the network adapter for the associated work queue element when all, outstanding TCP segments of the message have been acknowledged. The stagtoinval field 1009 maintains a 32-bit steering tag associated with an RDMA Read Request with Local invalidate option. The workreqidlow field 1010 and workreqidhi field 1011 together maintain the work request ID provided by the work queue element on the corresponding send queue. These fields 1010-1011 are used to post a completion queue event. The type field 1012 is maintained to identify the type of operation that is being requested by the send queue element including send. RDMA read, and RDMA write.

As is noted earlier, the specifications governing RDMA over TCP/IP transactions allow for out-of-order placement of received DDP segments, but require that all RDMA messages be completed in order. Furthermore, DDP segments corresponding to untagged RDMA messages have within their respective DDP headers all the information that is required to uniquely identify which specific RDMA message a DDP segment belongs to, which tells the receiving adapter which work queue entry is affiliated with the DDP segment. The receiving adapter needs this information to correctly report completions. In conjunction with stored TCP connection context information, an RDMA-enabled network adapter can determine from the information supplied within a DDP header regarding queue number, message sequence number, message offset, and the last flag whether all of the segments of a given RDMA message have been received and placed, thus allowing for in-order completion reporting.

Regarding tagged RDMA messages, including RDMA Write and RDMA Read Response, the only information of this sort which is supplied within their respective DDP headers are the steering tag ("STag") and tag offset (TO) fields. To recap, contents of the STag field specifies a particular buffer address for placement of data which has been previously negotiated between sender and receiver. And contents of the TO field prescribe an offset from the buffer address for placement of the data. There is no other information provided within a tagged DDP header that allows an RDMA-enabled network adapter to distinguish one tagged RDMA message from the next. And to report completions of RDMA operations in order, it is required to know which particular RDMA message has been received.

The ability to process and directly place out-of-order received DDP segments to a consumer buffer (identified by contents of the Stag field in the DDP header) is a very powerful feature which allows a reduction in memory size and memory bandwidth required for TCP stream reassembly, and furthermore reduces the latency of a corresponding RDMA operation. To allow for proper processing of placed data by a consumer application, RDMA messages must be reported to the consumer application as being completed in the order these RDMA messages were transmitted by the sender. The distinction between placement and completion (also referred to as "delivery") is common to prevailing RDMA, protocols, as exemplified by the RDMAC and IETF specifications noted above. Accordingly, an RDMA-enabled network adapter is allowed to place payloads of received DDP segments to consumer buffers in any order they are received, and as soon as the network adapter has enough information to identify the destination buffer. The consumer itself is not aware that the network adapter has placed the data. Yet, while data can be placed to the consumer buffer in any order, the consumer is allowed to use data only after it has been notified via the above described completion mechanisms that all data was properly received and placed to the consumer buffers. Thus, the consumer is not allowed to "peek" into posted buffers to determine if data has been received. Consequently, an RDMA-enabled network adapter must track out-of-order received and placed DDP segments to guarantee proper reporting of RDMA message completion, and to furthermore preserve the ordering rules described earlier.

It has been noted that tagged RDMA message types such as RDMA Read Response and RDMA Write do not carry message identifiers and thus, neither do their corresponding DDP segments. The information carried in their respective DDP segment headers, like contents of the STag and TO fields is necessary to identify a particular consumer buffer, but this information alone cannot be used to uniquely identify a particular RDMA message. This is because more than one RDMA message, sent sequentially or otherwise, may designate the same consumer buffer (Stag) and offset (TO). Furthermore, any number of network retransmission scenarios can lead to multiple receptions of different parts of the same RDMA message.

The ability to identify out-of-order placed messages is particularly important for RDMA Read Response messages, because placement of data corresponding to a Read Response message often requires a receiving RDMA-enabled network adapter to complete one or more outstanding consumer RDMA Read Requests.

Consider the following scenarios which illustrate the difficulties that a receiving RDMA-enabled network adapter can experience when it is required to determine which of many outstanding consumer RDMA Read Requests it can complete, after it has placed data from a DDP segment that has been received out-of-order. In a first case, as mentioned above, more than one RDMA Read Request can designate the same data sink consumer buffer. Thus, the RDMA-enabled network adapter issues multiple sequential one-byte RDMA Read Requests having the same local (data sink) consumer buffer, identified by the same (STag, TO, RDMA Read Message Size) triple. Subsequently, the same RDMA-enabled network adapter receives and places an out-of-order one-byte RDMA Read Response message having the (Slag, TO, RDMA Read Message Size) triple. Since the RDMA-enabled network adapter has multiple outstanding RDMA Read Requests with the same (STag, TO, RDMA Read Message Size) triple, this information is inadequate to identify which of the outstanding RDMA Read Requests is affiliated with the placed data.

In a second case, it is probable that the same DDP segment for an RDMA Read Response message type can be received more than once due to retransmission or network re-ordering. And although an RDMA network adapter is allowed to place such a segment multiple times into its target consumer buffer, the corresponding message must be reported as completed only once to the ULP. As a result of these scenarios, one skilled in the art will appreciate that the receiving RDMA-enabled network adapter cannot simply count the total number of out-of-order placed DDP segments with the Last flag set to determine the number of completed corresponding RDMA Read Response messages. Nor can it furthermore use this number to complete associated outstanding. RDMA Read Requests posted by the consumer.

In a third scenario, previously received and placed out-of-order RDMA Read Response segments may be discarded for, in some situations, the receiving RDMA-enabled network adapter can run out of resources, and may need to discard some portion of previously received and placed data, which may include one or more out-of-order placed and accounted for tagged DDP segments. This often means the RDMA-enabled network adapter must nullify its plans to eventually generate completions for the affected out-of-order placed RDMA Read Response messages, which can be algorithmically difficult.

Another undesirable mechanism provides only for placement of DDP segments that are received in order. Thus, a receiving RDMA-enabled network adapter may directly place only in-order received DDP segments, and will either drop or reassemble out-of-order received segments. To drop out-of-order received segments is disadvantageous from a performance perspective because dropping segments causes unnecessary network overhead and latency. Reassembly requires significant on-board or system memory bandwidth and size commensurate with the implementation of reassembly buffers which are commensurate with a high speed networking environment.

In contrast, apparatus and methods for in-order reporting of completed RDMA messages according to the present invention do not limit the number of segments that can be out-of-order received and directly placed to the consumer buffers, and scales well with the number of out-of-order received segments. The present invention additionally allows tracking of untagged RDMA messages which do not carry a message identifier in the header of their corresponding DDP segments, to include RDMA message types such as RDMA Read Response and RDMA Write. Techniques according to the present invention are based on additional employment of a data structure that is used to track information needed to provide for the selective acknowledgement option of TCP (i.e., TCP SACK option), while extending this structure to keep additional per-RDMA message type information.

In contrast, apparatus and methods for in-order tracking and reporting of completed RDMA messages according to the present invention do not limit the number of segments that can be out-of-order received and directly placed to the consumer buffers, and scales well with the number of out-of-order received segments. The present invention additionally allows tracking of untagged RDMA messages which do not carry a message identifier in the header of their corresponding DDP segments, to include RDMA message types such as RDMA Read Response and RDMA Write. Techniques according to the present invention are based on additional employment of a data structure that is used to track information that needed to provide for the selective acknowledgement option of TCP (i.e., TCP SACK option), while extending this structure to keep additional per-RDMA message type information.

Figure 11:
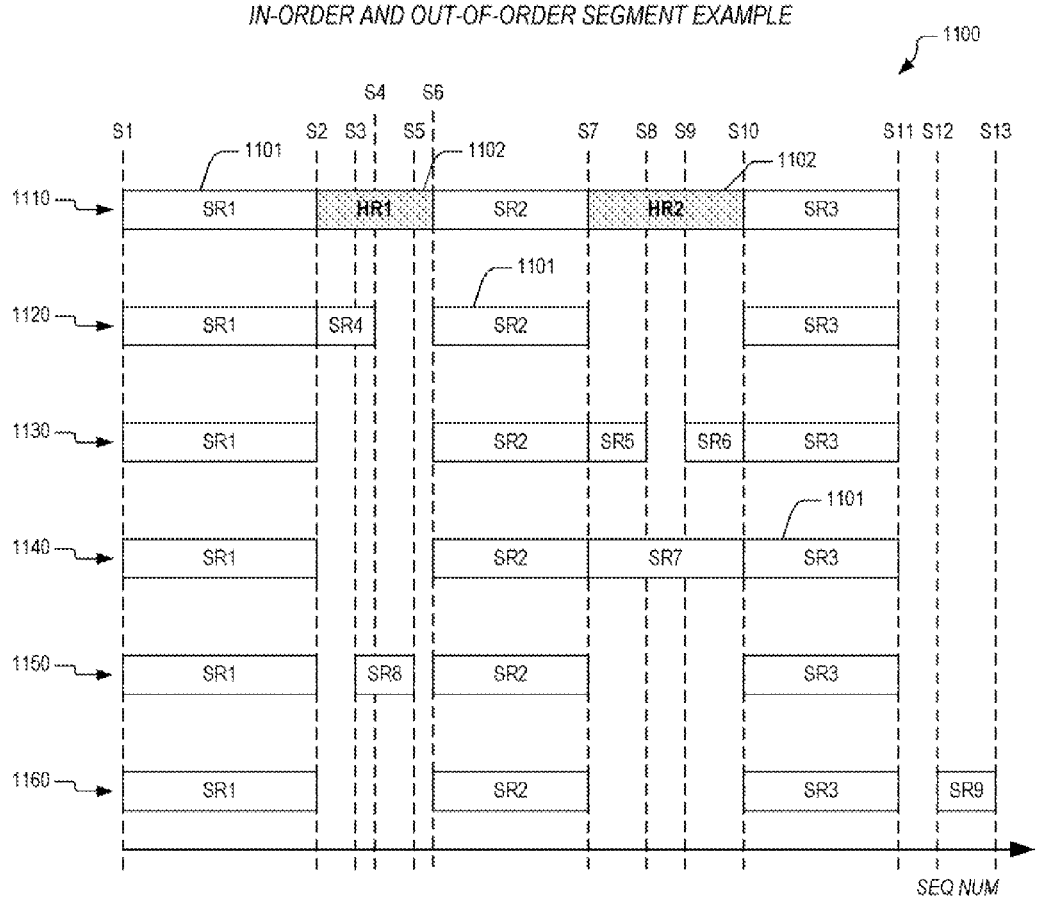
FIG. 11 is a diagram highlighting aspects provided according to the present invention that allow for out-of-order placement of received data while ensuring that message completions are tracked and reported in order.

Referring now to FIG. 11, a diagram 1100 is presented highlighting aspects provided according to the present invention that allow for out-of-order placement of received data while ensuring that message completions are tracked and reported in order. The present invention utilizes information that is required to perform TCP selective acknowledgement (TCP SACK), as is specified in RFC 2018, "TCP Selective Acknowledgement Options," The Internet Engineering Task Force, October 1996, available at http://www.ietf.org/rfc/rfc2018.txt. An in-depth discussion of this option is beyond the scope of this application, but it is sufficient to note that TCP SACK is employed by a data receiver to inform the data sender of non-contiguous blocks of data that have been received and queued. The data receiver awaits the receipt of data (perhaps by means of retransmissions) to fill the gaps in sequence space between received blocks. When missing segments are received, the data receiver acknowledges the data normally by advancing the left window edge in the Acknowledgment Number field of the TCP header. Each contiguous block of data queued at the data receiver is defined in the TCP SACK option by two 32-bit unsigned integers in network byte order. A left edge of block specifies the first sequence number of this block, and a right edge of block specifies the sequence number immediately following the last sequence number of the contiguous block. Each SACK block represents received bytes of data that are contiguous and isolated; that is, the bytes just below the block and just above the block have not been received. With this understanding, the diagram 1100 depicts several likely scenarios 1110, 1120, 1130, 1140, 1150, 1160 that illustrate how reception of DDP segments is viewed according to the present invention in terms of TCP sequence numbers.

A first scenario 1110 depicts three received sequence number ranges 1101: a first sequence number range SR1 which has been received in order. SR1 has a left edge sequence number of S1 and a right edge sequence number of S2. A second sequence number range SR2 is defined by a left edge of S6 and a right edge of S7. A sequence number void HR1 1102 (also referred to as a "hole" or "interstice") represents TCP sequence numbers which have not yet been received. Accordingly, a left edge of HR1 is defined by sequence number S2 and a right edge by S6. Since the sequence numbers of HR1 have not been received, sequence number range SR2 is said to be received "out-of-order." In like fashion, void HR2 defines another range of TCP sequence numbers that have not been received. HR2 has a left edge of S7 and a right edge of S10. And another sequence number range SR3 is thus received out-of-order because of void HR2 SR3 has a left edge of S10 and a right edge of S11.

Consider now that additional data is received over a corresponding TCP stream by an RDMA-enabled network adapter according to the present invention. Scenarios 1120, 1130, 1140, 1150, and 1160 discuss different ways in which the additional data can be received as viewed from the perspective of TCP sequence number space in terms of in-order and out-of-order received segments.

Consider scenario 1120 where additional data having sequence number range SR4 is received. SR4 has a left edge of S2, which corresponds to the right edge of in-order sequence number range SR1. Consequently, the addition of SR4 can be concatenated to in-order range SR1 to form a larger in-order sequence number range having a left edge of S1 and a right edge of S4. A void (not precisely depicted) still remains prior to SR2 and SR3. Thus SR2 and SR3 remain as out-of-order received segments.

Consider scenario 1130 where additional data having sequence number ranges SR5 and SR6 is received. SR5 has a left edge of S7, which corresponds to the right edge of out-of-order sequence number range SR2. Consequently, the addition of SR5 can be concatenated to out-of-order range SR2 to form a larger out-of-order sequence number range having a left edge of S6 and a right edge of S8, but the range still remains out-of-order because of the void between SR1 and SR2. Likewise, SR6 has a right edge of S10, which corresponds to the left edge of out-of-order sequence number range SR3. Thus, the addition of SR6 can be concatenated to out-of-order range SR3 to form a larger out-of-order sequence number range having a left edge of S9 and a right edge of S11, but the range still remains out-of-order because of the void between SR1 and SR2 and the void between SR5 and SR6.

Scenario 1140 is provided to illustrate complete closure of a void between S7 and S10 by additional data SR7. SR7 has a left edge of S7, which corresponds to the right edge of out-of-order sequence number range SR2 and SR7 has a right, edge of S10, which corresponds to the left edge of SR3. Accordingly, the addition of SR7 is concatenated to out-of-order ranges SR2 and SR3 to form a larger out-of-order sequence number range having a left edge of S6 and a right edge of S11. A void still remains prior to SR2 and consequently, the larger number range defined by S6 and S11 is still out-of-order.

Scenario 1150 illustrates additional data received between S3 and S5, which adds another out-of-order sequence range SR8 to that already noted for SR2 and SR3. SR8 is shown received between SR1 and SR2 in TCP sequence number space, however, since SR1, SR8, and SR2 have no demarcating edges in common, SR8 simply becomes another out-of-order sequence number space.

Finally, scenario 1160 illustrates additional data received between S12 and S13, which adds another out-of-order sequence range SR9 to that already noted for SR2 and SR3. SR9 is shown received to the right of SR3, thus providing another out-of-order sequence number space SR9 and another void that is defined by S11 and S12.

An RDMA-enabled network adapter according to the present invention provides for reception, tracking, and reporting of out-of-order received TCP segments, like segments SR2, SR3, SR8, SR9, and the concatenated longer out-of-order segments discussed above. The network adapter utilizes this information, in conjunction, with the information provided in corresponding received DDP segment headers (i.e., STag, TO and the last flag) to efficiently and effectively track and report completions of RDMA messages in order, while still allowing for direct placement of data from out-of-order received DDP segments. In one embodiment, transaction logic as discussed above with reference to FIGS. 5-7 records data corresponding to out-of-order and in-order received TCP segments in order to reduce the number of TCP segments that need to be retransmitted by a sender after an inbound TCP segment is lost, or reordered by the network. One record per out-of-order segment range is kept. Each record includes the TCP sequence number of the left and right edges of an out-of-order segment range. In an alternative embodiment, one record per TCP hole is kept where each record includes the TCP sequence number of the left and right, edges of a TCP hole. Hereinafter, details of the out-of-order segment range record are described and it is noted that one skilled in the art will be able to apply these details to implement and use the TCP hole embodiment.

To properly support placement of out-of-order received DDP segments, the transaction logic, in addition to recording TCP sequence numbers for each out-of-order segment range, also records the number of received DDP segments which had a corresponding last flag asserted thr each out-of-order segment range. This is performed for each RDMA message type newly received and placed. In one embodiment, these records comprise counter fields which are referred to in more detail below as RDMAMsgTypeLastCnt. For RDMA Read Response messages, the counter field is referred to as RDMAReadRespLastCnt. For RDMA Write messages, the counter field is referred to as RDMAWriteLastCnt.

When a DDP segment with last flag asserted is received, the transaction logic identifies the in-order or out-of-order segment range to which the segment belongs and increments the respective RDMAMsgTypeLastCnt field belonging to that segment range, if the segment has not already been received and placed in the respective segment range. In one embodiment, an RDMA-enabled network adapter according to the present invention supports 65,536 out-of-order segment range records, and if a DIP segment arrives when these records are all in use it may drop the newly arrived DDP segment or discard a previously received out-of-order segment range by deleting its associated out-of-order segment range record. When an out-of-order segment range record is deleted, all RDMAMsgTypeLastCnt values included in that out-of-order segment range record are likewise discarded.

When a TCP hole is closed, same-type RDMAMsgTypeLastCnt counters of the joined segment ranges are summed for each RDMA message type, and this summed information is kept in a record for the joined segment range. Summing is performed when an in-order segment range is concatenated with an out-of-order segment range, and also when two adjacent out-of-order segment ranges are joined.

When the transaction logic advances a corresponding TCP.RCV.NXT receive sequence variable upon closure of a TCP hole adjacent to an in-order segment range and placement of associated data payload, it will then generate and report completions associated with this previously placed data which is now in-order in TCP sequence space to the ULP. The RDMAMsgTypeLastCnt counters make it easy to determine how many RDMA messages are contained within said previously placed data. These counters, along with additional connection context information such as, the message type, notify_on_completion, and final_seq_num parameters stored in the Transmit FIFO described above are employed to generate and report message completions. For example, suppose that there are three RDMA Read requests outstanding when an RDMA Read Response segment having a last flag asserted is received that closes a TCP hole between an in-order segment range having no last flags asserted and an out-of-order segment range having two last flags asserted. Since out-of-order data placement is supported, all of the data in the out-of-order segment range has already been received and placed, including two segments with the Last flag set that correspond to two of the outstanding RDMA Read requests. Thus, the counter RDMAReadRespLastCnt is set to 2 for the out-of-order segment range. The arrival of the missing segment that fills the void enables the transaction logic to move the corresponding TCP.RCV.NXT variable from the right edge of the in-order segment range to the right edge of the out-of-order segment range. Once the missing segment is placed, following the algorithm described previously, the RDMAReadRespLastCnt for the in-order segment range (which is equal to 1 because the missing segment has its last flag set) is summed to the RDMAReadRespLastCnt corresponding to the out-of-order segment (which is equal to 2 as noted), to yield an RDMAReadRespLastCnt equal to 3 for the joined segment range. Because there are three RDMA Read requests outstanding, and based on the RDMAReadRespLastCnt summation, the transaction logic determines that all three of the associated read responses have been placed and are now in-order in TCP sequence space. Accordingly, a completion for each of the outstanding RDMA Read requests is generated and reported to the ULP.

Figure 12:
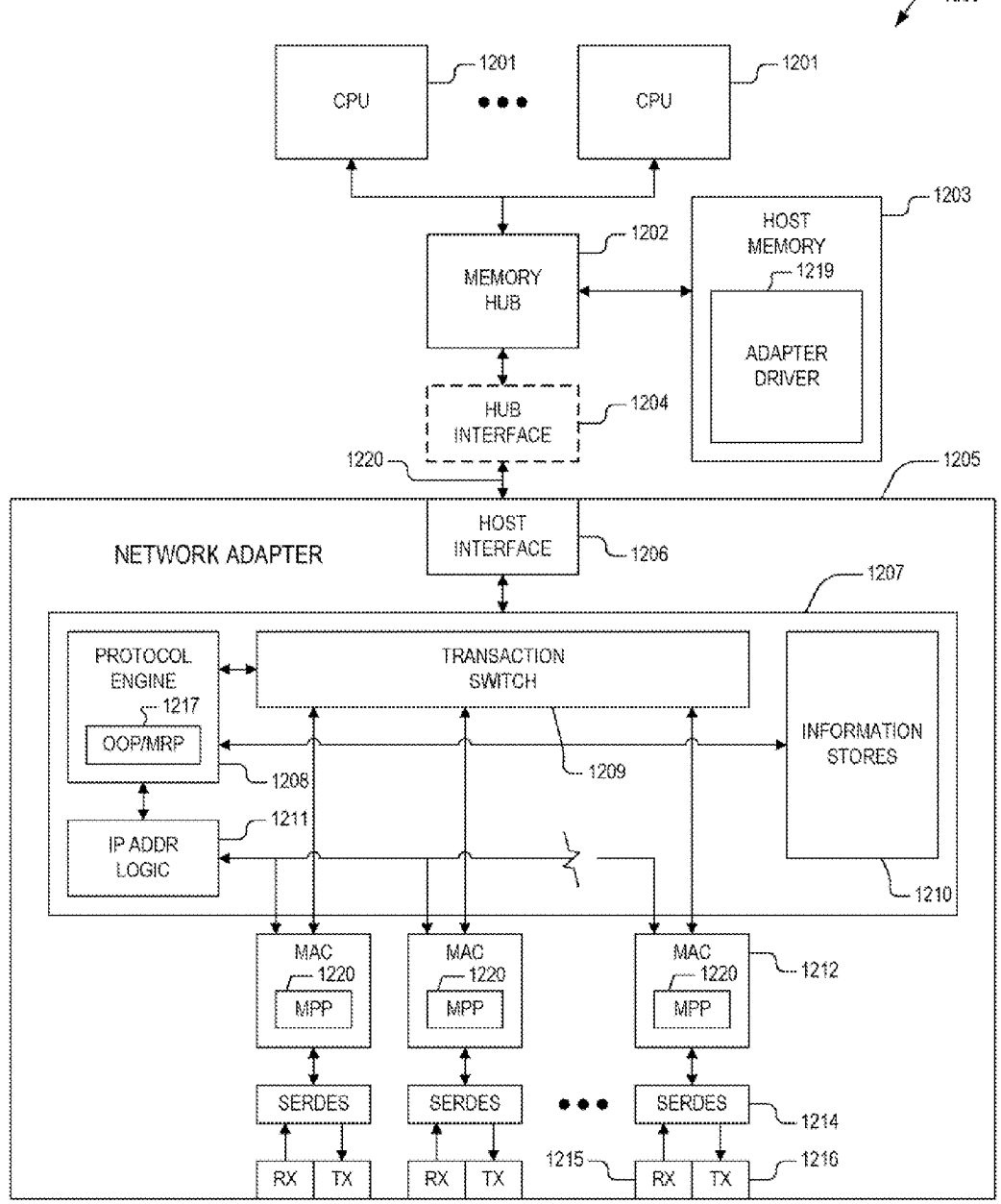
FIG. 12 is a block diagram of an RDMA-enabled server according to the present invention featuring mechanisms for performing speculative MPA CRC calculations on arriving packets.

Now referring to FIG. 12, a block diagram is presented of an RDMA-enabled server 1200 according to the present invention featuring a mechanism for performing speculative MPA CRC calculations along with a mechanism for in-order delivery of RDMA messages. The server 1200 of FIG. 12 includes elements substantially the same as and configured similarly in fashion to like-named and numbered elements described above with reference to FIG. 7, where the hundreds digit is replaced with a "12." in contrast to the server 700 of FIG. 7, the server 1200 of FIG. 12 includes an out-of-order processor/MPA reassembly processor (OOP/MRP) 1217 within the protocol engine 1208 and includes information stores 1210 which is coupled to the protocol engine 1208. The server 1200 according to the present invention also includes a MAC packet parser (MPP) 1220 within each of the MACs 1212. An alternative embodiment is contemplated where corresponding MPPs 1220 exist as elements separate from each of the MACs 1212 and are coupled to corresponding MACs 1212 and to the transaction logic 1207.

Operation of the server 1200 is described first with respect to tracking and reporting of completed RDMA operations. When a connection experiences inbound packet loss, an out-of-order segment range record within the information stores 1210 is dynamically allocated and is bound to a corresponding TCP connection, as alluded to above, thus providing for communication of TCP SACK option data to an associated partner as defined by the connection. One out-of-order segment range record (or, "SACK context record") is employed per TCP connection. An out-of-order segment range record is dynamically bound to a given TCP connection by updating a field in a TCP connection context stores record that corresponds to the TCP connection, TCP connection context stores are also part of the information stores 1210, as will be described in further detail below. In one embodiment, 65,535 out-of-order segment range records are provided for according to the present invention. In the event that all SACK context records have been allocated, TCP fast retransmit/TCP retransmission is employed rather than TCP SACK. Each SACK context record provides for tracking of up to four variable-sized SACK blocks. Thus, up to four contiguous ranges of TCP data payload can be received out-of-order and tracked for each allocated connection.

The OOP/MRP 1217 performs operations related to any inbound packet that arrives out-of-order. These operations include updating SACK context records as previously described and also include tracking and update of connection state associated with any FPDU that is received which has an MPA CRC error, along with tracking and update of connection state associated with partial FPDUs, multiple PDUs within an single TCP segment, and unaligned FPDUs as described above. In addition, the OOP/MRP 1217 dynamically binds SACK Context records to work queues for which data has been placed out-of-order and which have outstanding RDMA read requests and/or uncompleted RDMA sends, or unscheduled inbound RDMA read requests. For these types of messages, entries within the out-of-order segment range record stores 1210 are created and updated until all associated segments have been received in order and data has been placed by the transaction logic 1205 into host memory 1203. When all of the associated segments have been received and their data placed, the transaction logic 1207 reports outstanding messages as being complete to the ULP.

With regard to performing MPA CRC calculations, the present inventors note that it would be disadvantageous to compute and perform CRC validations when FPDUs have been fully received prior to placing their associated data into host memory 1203. At that point, all the required state information would be available for calculating a CRC and for comparing the calculated CRC with a corresponding MPA CRC field; specifically, the starting TCP sequence number of the MPA header that contains the length of the PDU. But the present inventors also note that this approach is limiting when an MPA CRC error is detected because all the state that was processed and updated based on receiving an FPDU must be discarded (i.e., rolled back) because the FPDU is found to be in error. A further problem with this approach is that when a CRC error is detected, an adapter operating at 10 Gb/sec line speeds would most likely have processed a number of subsequent FPDUs based on erroneous state information, which further complicates a roll back function to a last known good state. These are only two of the numerous disadvantages associated with waiting until PDUs are ready for placement in host memory 1203 prior to performing CRC computations. Other undesirable approaches include calculation of CRCs after complete reception of an Ethernet frame or providing intermediate buffering of received FPDUs for purposes of performing CRC calculations. Both of these approaches add latency to the flow.

The present invention overcomes the problems noted above, and others, by performing a speculative MPA CRC check while a frame is streaming through an associated MPP 1220 into the transaction logic 1207. Accordingly, a presumed aligned FPDU contained therein is known to be valid within a few cycles of receiving the end of the corresponding TCP segment. To perform the speculative check involves making assumptions regarding the configuration of the received TCP segment, as will be further described below. By assuming the configuration of the received segment, an RDMA-enabled network adapter is provided which allows for on-the-fly MPA CRC calculations to be made concurrent with packet reception.

As has been previously noted, TCP is a byte stream oriented protocol which doesn't have to preserve TCP segment boundaries, thus making it difficult to locate the MPA headers in the data stream. Furthermore, the MPA protocol allows for the inclusion of MPA markers in FPDUs that point, back to corresponding MPA headers. Although marker placement is allowable as an option under MPA, it is not required. When enabled, these markers must be placed every 512 octets in the TCP byte stream. Placing markers in the TCP stream enables an RDMA-enabled network adapter according to the present invention to place received FPDUs out of order into host memory 1203 as described above. Once an MPA header is located in the TCP byte stream, its corresponding FPDU is processed as are any subsequently received FPDUs received.

One skilled in the art will appreciate, however, that because MPA markers must be placed at 512-byte intervals in the TCP byte stream, they can occur anywhere in a TCP data segment, including anywhere from immediately preceding an MPA header to immediately preceding a corresponding MPA CRC field. For the special case where the MPA marker immediately precedes the MPA header, the pointer field therein is set to zero. Thus, the MPA marker may be found within DDP or RDMAP headers, or within the FPDU data itself.

As stated earlier, it is desirable from the standpoint of implementing an efficient RDMA-enabled network adapter to provide for the use of MPA markers, and to furthermore provide for the transmission of aligned FPDUs. However, not all connections are required to use markers, and it is probable that such an adapter may be deployed in environments that result in the reception (or even transmission) of unaligned FPDUs due to segmentation, segment combining, IP fragmentation, change in MSS size in the presence of timeouts, etc. For example, an FPDU may be received that has no marker therein, or multiple markers (a function of packet size). The FPDU may have only data, or data and one or more markers. The TCP segment may have a partial MPA header, or multiple MPA headers and associated FPDU data. The TCP segment may include an integral number of FPDUs or some number of complete FPDUs and up to two partial FPDUs. The OOP/MRP 1217 and out-of-order segment range record stores 1210 are employed to deal with the situations where received segments cannot be immediately validated and placed, and such processing, which requires intermediate buffering of said received segments, does indeed add latency to the flow. Accordingly, unaligned frames which are received by the MACs 1212 are processed by the protocol engine 1208 for purposes of performing CRC calculations and validation of MPA CRCs. But the present inventors contemplate that any of the above cases that result in the reception of unaligned FPDUs, partial FPDUs, or out-of-order FPDUs are exceptional, and to provide a baseline adapter 1205 which waits to validate MPA CRCs until in-order reception of TCP segments has been verified by the protocol engine 1208 would result in an exceedingly inefficient flow of packets at the line speeds contemplated.

Accordingly, the block, diagram 1200 includes a MAC packet parser 1220 within each of the MACs 1212. The MPPs 1220 each perform speculative on-the-fly stateless MPA CRC calculations by making assumptions about the properties of received TCP segments, as will be described in more detail below, thus avoiding the latency penalty and bandwidth requirements of making a separate pass through the data following verified in-order reception.

For received packets, the MPPs 1220 perform packet classification and basic checks while packets are flowing into the transaction switch 1209. More specifically, the MPPs 1220 perform speculative MPA CRC validations for all received packets. All of these speculative operations are performed "stateless," that is, without a priori knowledge of TCP segment contents. To perform these operations, the MPPs 1220 consider that every TCP segment received is for an accelerated TCP connection and that the TCP segment indeed contains RDMA FPDUs. This assumption will not always be correct because, in an adapter that supports both accelerated TCP connections (connections as described herein) and conventional (i.e., "unaccelerated") TCP connections, many received TCP segments will not contains FPDUs as previously described. One skilled will appreciate that at the MAC processing level, when a TCP segment is received, it's corresponding connection context is yet to be determined. But if it turns out that presumptions about the received packet are correct, then flow latency has been precluded because corresponding MPA CRC checks have been performed concurrent with packet reception. If later processing determines that the packets do not correspond to accelerated RDMA-enabled connections, then the CRC status is discarded, at no additional cost to processing time.

In addition, the MPPs 1220 consider that every TCP segment received starts with an MPA header immediately following the TCP header. As one skilled in the art will appreciate, a TCP header within a received Ethernet frame is always at the same location and can be easily located during reception. Thus, the present invention provides for an RDMA-enabled network adapter 1200 that is optimized for handling most probable reception conditions rather than the exception conditions caused by combining, resegmentation, and the like. Furthermore, the MPPs 1220 presume three mutually exclusive cases for use of markers and perform MPA CRC checks in parallel for each of the three cases. A first case performs MPA CRC checks (i.e., MPA CRC comparison) under the assumption that MPA markers have not been enabled and that every TCP segment received contains one (or more) complete FPDUs without any MPA markers. A second case performs MPA CRC checks under the assumption that MPA markers are enabled and that every TCP segment received contains one (or more) complete FPDUs with MPA markers, where the FPDUs contain a minimum number of MPA markers based upon the number of bytes received. For example, a received TCP segment having 100 bytes for FPDUs can have a minimum of 0 MPA markers and a maximum of 1 MPA markers placed therein, because MPA markers must be placed every 512 bytes in the TCP stream. Finally, a third case performs MPA CRC checks under the assumption that MPA markers are enabled and that every TCP segment received contains one more) complete FPDUs with MPA markers, where the FPDUs contain the maximum number of MPA markers based upon the number of bytes received. These three stateless MPA CRC checks are performed concurrent with reception of each packet and the results of all three checks are provided to the protocol engine 1208 following packet reception.

Recall that the protocol engine 1208 has access to the connection context for the received TCP segment, and thus can determine whether a connection is accelerated or not, whether markers are employed or not, whether partial FPDUs are expected or not, and etc. Consequently, the protocol engine 1208 selectively employs the results of the three CRC checks provided by each of the MPPs 1220 for each received TCP segment. For example, if a given received TCP segment is classified by the protocol engine 1208 as unaccelerated, then the CRC status results are discarded. If the connection context is not for an RDMA connection, the CRC status results are discarded. If the connection context indicates that the connection is an accelerated RDMA connection, then the protocol engine 1208 selectively employs the CRC status results based upon whether or not markers are enabled and utilizes either minimum marker or maximum marker CRC status results based upon calculation of marker positions as determined by locations of previous markers and received TCP sequence numbers. One embodiment contemplates connections where MPA CRC checking is disabled. In such an embodiment, all three status results are discarded. Any exceptional cases (e.g., partial FPDUs, incorrect CRCs, etc) are provided to the OOP/MRP 1217 for further processing.

Figure 13:
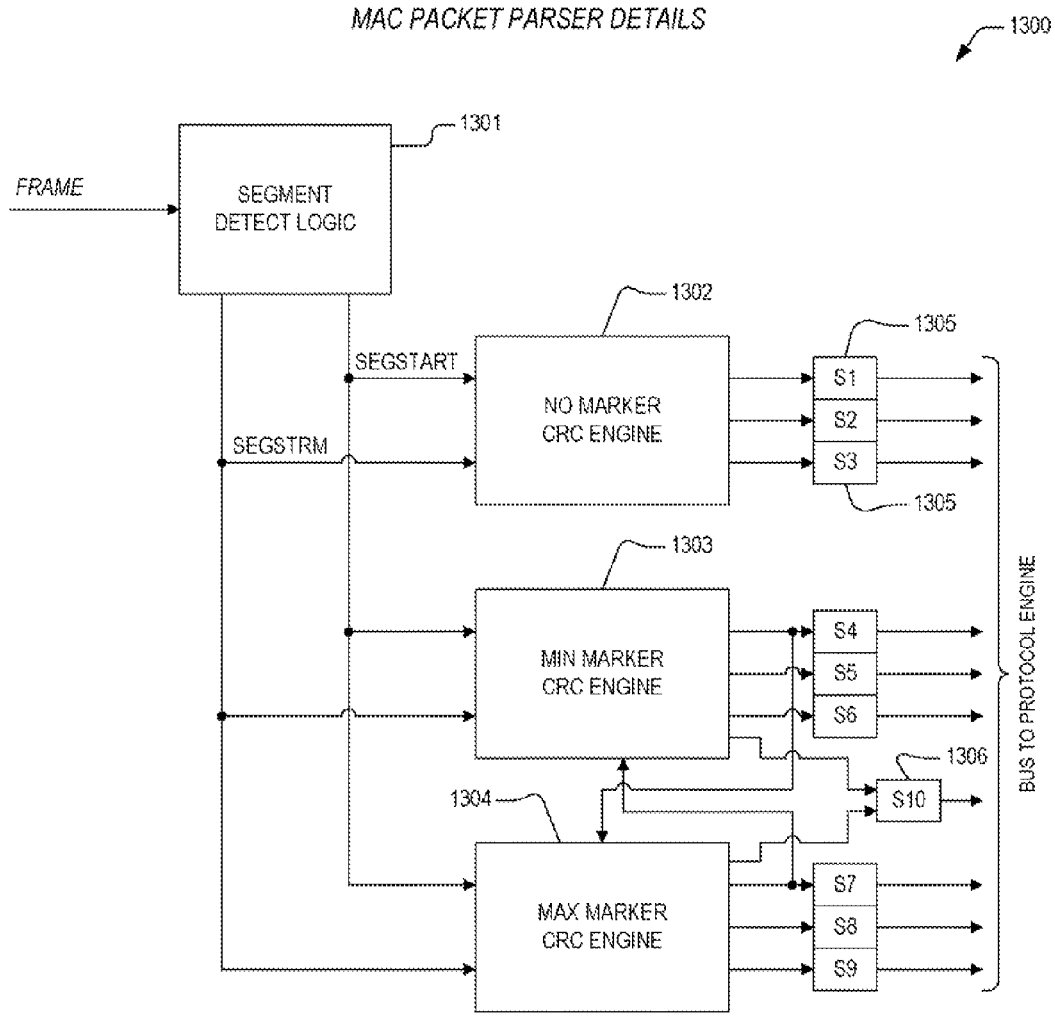
FIG. 13 is a block diagram details of a MAC packet parser according to the present invention.

Now referring to FIG. 13, a block diagram is provided illustrating details of an exemplary MPP 1300 according to the present invention. The MPP 1300 includes segment detect logic 1301 that is coupled to a no marker CRC engine 1302, a minimum marker CRC engine 1303, and a maximum marker CRC engine 1304. The segment detect logic 1301 receives an Ethernet frame via bus FRAME from within a corresponding MAC and indicates a TCP segment start via bus SEGSTART to each of the engines 1302-1304. The TCP segment data is provided to each of the engines 1302-1304 via bus SEGSTRM.

The no marker engine 1304 generates three status bits 1305, S1-S3. The minimum marker engine 1303 generates three status bits 1305, S4-S6 and an output that provides status bit S4 is coupled back to the maximum marker CRC engine 1304. The maximum marker engine 1304 generates three status bits 1305. S7-S9 and an output providing status bit S7 is coupled back to the minimum marker CRC engine 1303. The minimum marker engine 1303 and the maximum marker engine 1304 jointly provide outputs to a jointly developed status bit 1306, S10.

In operation, the no marker CRC engine 1302 generates CRCs on incoming packets under the no marker assumptions detailed above. More particularly, the segment detect logic 1301 indicates the start of a TCP segment via bus SEGSTRM and the no marker engine 1302 determines the location of a speculative ULPDU_length field therein by assuming that the two bytes immediately following the TCP header contain the MPA header (of which the ULPDU_length field is a part). The contents of the length field indicate the length in bytes of the FPDU. Based on that length, the engine 1302 calculates a location in the TCP stream containing speculative MPA CRC bytes. Accordingly, the engine 1302 performs a cyclic redundancy check on all the data using the speculative MPA CRC, to determine whether the CRC is correct. If data is still being received for the current TCP segment and a previous MPA CRC check was correct, then the no marker CRC engine 1302 continues by reading the next two bytes following the speculative MPA CRC bytes and interprets the next two bytes as a ULPDU_length field for a following FPDU. The engine 1302 thus performs a following MPA CRC calculation for the following FPDU. The segment detect logic indicates the end of the TCP segment over bus SEGSTART. Accordingly, at the end of the TCP segment the no marker CRC engine reports to the protocol engine the results of the MPA CRC checks in the form of the three status bits S1-S3: assertion of bit S1 indicates a good CRC. Assertion of bit S2 indicates multiple FPDUs. And assertion of bit S3 indicates a bad CRC or a partial FPDU.

For example, if the no marker CRC engine 1302 detects an invalid CRC or there is not enough data to perform the CRC calculation (as can occur when a partial FPDU is received), then the engine 1302 stops performing CRC calculations for the remainder of the current TCP segment and will assert bit S3, thus indicating a bad CRC or partial FPDU. Bits S1 and S2 are deasserted. After stopping, the engine 1302 will begin calculating CRCs at the start of the next TCP segment received, as indicated by bus SEGSTART.

If the no marker engine 1302 calculates multiple valid MPA CRCs, then it will assert bits S1 and S2, indicating good CRCs and multiple FPDUs received. Bit S3 is deasserted to indicate that multiple valid FPDUs are present in the received TCP segment and all FPDUs have valid MPA CRCs.

If there are multiple FPDUs in the TCP segment and one or more of the MPA CRCs are good, but at least one invalid MPA CRC is detected, then the no marker engine 1302 deasserts bits S1 and S2 and asserts bit S3, indicating a bad CRC.

The minimum marker engine 1303 and the maximum marker engine 1304 are employed to perform MPA CRC checks under the above noted assumptions that MPA markers are being employed. Recall, when a TCP segment is received by a MAC, the MAC has no state information available to determine exactly how many markers the TCP segment contains. For conventional Ethernet framing, the TCP segment can contain between 0 and 18 markers. One skilled will appreciate that Ethernet 9K jumbo packets have enough bytes for 18 markers placed at 512-byte intervals. For example, if an FPDU is received that is 100 bytes long, there could be 0 or 1 marker placed therein. Accordingly, there are two possible speculative MPA CRC locations for this FPDU: one assuming the minimum number of MPA Markers (0) and the other assuming the maximum number of MPA Markers (1). Thus, the minimum marker CRC engine 1303 assumes the fewest number of markers present to determine the location of the speculative MPA CRC field and the maximum marker engine 1304 assumes the maximum number of MPA markers present to determine the location of the speculative MPA CRC field. In the case of a 100-byte FPDU contained within a TCP segment, the minimum marker engine 1303 assumes 0 markers and the maximum marker engine 1304 assumes 1 MPA marker present. If a TCP segment is received where the assumed ULPDU_length field contains 512 bytes or less, then there could be 0 or 1 marker present. If the ULPDU_length is say, 516 bytes, there could be either 1 or 2 markers present. If the ULPDU_length is 1400 bytes, there could be 2 or 3 markers present in the data stream. And so on. Hence, the minimum and maximum marker engines 1303-1304 are collectively called the marker engines 1303-1304.

The minimum marker engine 1304 thus calculates and validates a speculative MPA CRC assuming a received TCP segment has the fewest number of markers that can be present. Likewise the maximum marker engine 1304 validates a speculative MPA CRC assuming the received TCP segment contains the maximum number of markers. Both marker engines 1303-1304 assume that the two bytes immediately following the TCP header in a received stream, as indicated by bus SEGSTART, contain the MPA ULPDU_length field and the engines 1303-1304 thus calculate respective CRCs for all the data up to and including their corresponding speculative MPA CRC locations. The marker engines 1303-1304 perform a cyclic redundancy check on all the data using their respective speculative MPA CRCs, to determine whether each CRC is correct. The minimum marker engine 1304 calculates its CRC on all the data up to and including its associated MPA CRC location, but assumes there are Nmin bytes in the FPDU representing the minimum number of markers possible, where Nmin=minimum number of markers*4 bytes. The maximum marker engine 1304 calculates its CRC on all the data up to its corresponding speculative MPA CRC location, but assumes there are Nmax bytes in the FPDU representing the maximum number of markers possible, where Nmax=maximum number of markers*4 bytes.

When the end of a TCP segment is reached, as indicated by bus SEGSTART, the results of the minimum marker and maximum marker engines 1303-1304 are reported in the seven additional status bits 1305-1306, S4-S10 to the protocol engine. Bits S4 and S7 indicate a good CRC check. Bits S5 and S8 indicate respective indications of multiple FPDUs within the TCP segment. Bits S6 and S9 indicate respective had CRCs or partial FPDUs. And jointly reported bit S10 indicates an ambiguous CRC check.

In the case that there are multiple FPDUs contained in a single TCP segment, the minimum marker and maximum marker engines 1303-1304 vote on the results through cross feedback of the outputs providing bits S4 and S7. The assumption is that an MPA CRC will normally be valid. Hence, if the minimum marker engine 1303 reports finding a valid CRC by asserting bit S4, and the maximum marker engine 1304 reports an invalid CRC by deasserting bit S7, then the maximum marker engine 1304 assumes that the minimum marker engine results (bit S4) were correct and starts calculating a speculative MPA CRC for a following PPM starting from the same location in the TCP segment where the minimum marker engine 1303 starts. On the other hand, if the maximum marker engine finds a valid MPA CRC and asserts bit S7 and the minimum marker engine result is invalid (i.e., S4 is not asserted), then the minimum marker engine reads bit S7 and starts calculating a speculative MPA CRC for a following FPDU starting from the same location in the TCP segment where the maximum marker engine 1304 starts. If neither the minimum marker engine 1303 nor the maximum marker engine 1304 find valid CRCs, then both marker engines 1303-1304 stop calculating MPA CRCs for the current TCP segment. They will start again upon reception of the next TCP segment, as indicated via bus SEGSTART. It is conceivable that given the right data pattern, both the minimum marker engine 1303 and the maximum marker engine 1304 will calculate valid CRCs. In that case, as is determined by cross feedback of bits S4 and S7, the two marker engines jointly report that the CRC check is ambiguous by asserting status bit S10. Bits S5-S6 and S8-S9 are controlled are reported to the protocol engine in substantially the same manner as bits S2-S3 for the no marker case.

The protocol engine uses bits S1-S10 to determine how to process a received TCP segment. As noted above, if the TCP segment corresponds to an accelerated TCP connection but is not an RDMA connection, then the 10 bits 1305-1306 are ignored. If the connection is accelerated and is an RDMA connection, then the protocol engine will determine if markers are enabled or not and if the MPA CRCs are enabled or not, if markers are not enabled, but MPA CRC checking is enabled, then the protocol engine will employ bits S1-S3, as reported from the no marker engine 1302 to determine how to process the corresponding TCP segment. If markers are enabled and the MPA CRC checking is also enabled, then the protocol engine will examine bits S4-S10 to determine how to process the received segment. Since the protocol engine has the required connection context information e.g., TCP sequence numbers and locations of MPA markers), it knows whether to use bits S4-S6 or bits S7-S9 for processing of the current TCP segment.

If MPA CRC checking is not enabled, then bits S1-S10 are ignored and the TCP segment will be processed as allowed by the protocol. For example, if the TCP segment is received in-order or the TCP segment is received out-of-order but the MPA marker therein points to the header in the received TCP segment, and the length of the TCP segment is sufficient to contain the entire FPDU, then the segment will be processed.

If MPA CRC is enabled for the connection currently being processed and the protocol engine receives a had CRC or partial FPDU indication (e.g., bits S3, S6, and S9) from the selected engine, or if bit S10 is asserted, indicating an ambiguous CRC check, then the TCP segment is routed to the slow path (i.e., to the OOP/MRP) for additional processing to determine if the actual MPA header perhaps did not immediately follow the TCP header, as is the case for unaligned or partial FPDUs, or to determine which is the correct MPA CRC in the case where an ambiguous CRC (bit S10) is reported.

Since the MPP 1300 is making assumptions about where the location of the MPA ULPDU_length field is in a packet, it is possible for an RDMA-enabled network adapter according to the present invention to receive TCP segments that violate the assumptions. For example, retransmitted TCP segments created following a reduction in MSS may not have valid MPA headers following the TCP header.

For packets that violate the assumptions, it is possible that one (or more) of the CRC engines 1302-1304 will falsely calculate a valid MPA CRC. This can occur when the two bytes read and assumed to be the ULPDU_length point to a location in the segment containing what appears to be a correct MPA CRC. When this false ULPDU_length and MPA CRC entirely fill a TCP segment, then from perspective of the MPP 1300, there is one (or more) valid FPDUs within this TCP segment. The present inventors note however that the likelihood of the MPP 1300 using a false ULPDU_length and calculating a CRC over all of the intervening data, and furthermore matching the calculated CRC to whatever random data pattern happens to be at a false MPA CRC location, and moreover for the false ULPDU_length to line up perfectly with the end of the TCP segment, is indeed very low. But to cover such a situation, the protocol engine performs a marker check to determine if the received segment (while it looks good to the MPP 1300) is a complete and valid FPDU. This check is performed by reading a single marker from the received TCP segment and verifying that it points to a valid MPA header if this marker points to the beginning of the TCP segment, then the protocol engine completes processing of the FPDUs contained in the TCP segment. If the marker points to a different TCP segment, then the TCP segment does not contain a valid MPA and the TCP segment is forwarded to OOP/MRP for processing by the slow path.

If a segment is received out-of-order and there is no marker, or markers are not enabled, then the segment cannot be processed on-the-fly and is thus routed to OOP/MRP for processing by the slow path, even if the MPP 1300 reports that this segment has a valid MPA CRC.

By making the assumptions mentioned above, an RDMA-enabled network adapter according to the present invention can perform speculative MPA CRC calculations on-the-fly as packets arrive, thus insuring that protocol state is only modified based on valid FPDUs with good MPA CRCs. Checking the MPA CRC concurrent with reception has the advantage that rollback of context in the case of an MPA CRC error is not required. And in the most probable reception case (i.e., aligned FPDUs), slow path processing latencies are precluded altogether.

In the discussion above, particularly with reference to FIGS. 12-13, aspects of the present invention are described that enable speculative calculations of MPA CRCs on-the-fly as packets arrive. This is one of the issues, as alluded to earlier, which must be addressed in order for an RDMA-enabled network adapter to operate as multi-Gigabit speeds, and which is provided for by the present invention. Another related issue, to recap, is the efficient insertion and removal of MPA markers. The present invention also overcomes the limitations of present day techniques by providing techniques for on-the-fly insertion and removal of MPA markers, which function effectively even under circumstances where unaligned FPDUs are present within transmitted or received TCP segments as a result of segment fragmentation or combination. On-the-fly MPA marker insertion and removal techniques will now be discussed with reference to FIGS. 14-15.

Figure 14:
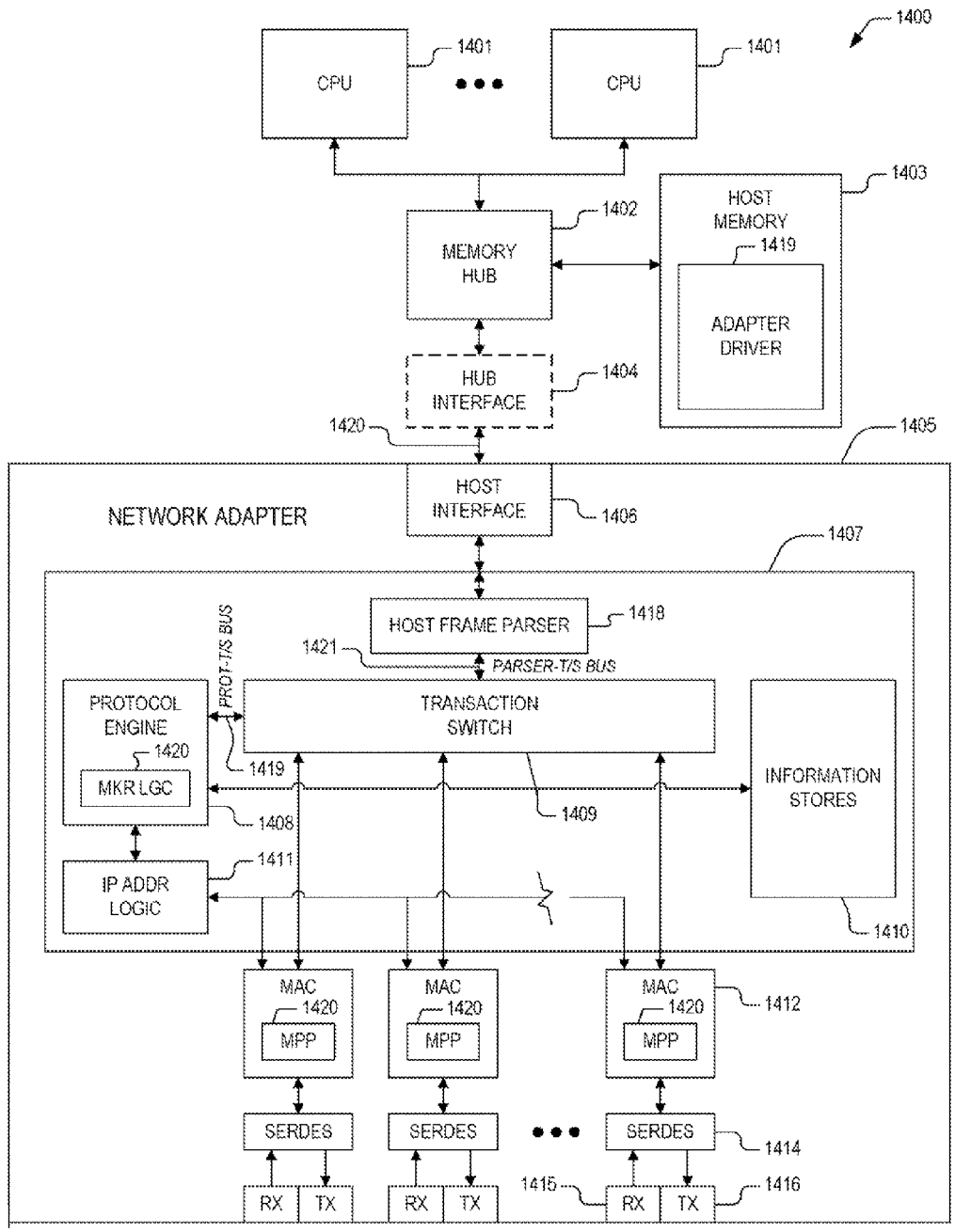
FIG. 14 is a block diagram of an RDMA-enabled server according to the present invention featuring mechanisms for performing on-the-fly MPA marker insertion and removal.

Tow turning to FIG. 14, a block diagram is presented of an RDMA-enabled server 1400 according to the present invention featuring a mechanism for on-the-fly MPA marker insertion and removal. The server 1400 of FIG. 14 includes elements substantially the same as and configured similarly in fashion to like-named and numbered elements described above with reference to FIG. 12, where the thousands and hundreds digits are replaced with a "14." In contrast to the server 700 of FIG. 7, the server 1400 of FIG. 14 also includes a host frame parser 1418 that is coupled between the transaction switch 1409 and the host interface 1406. The protocol engine 1408 additionally includes marker logic 1420. The host frame parser 1418 is coupled to the transaction switch 1409 via a host frame parser-transaction switch bus 1421. The protocol engine 1408 is coupled to the transaction switch 1409 via a protocol engine-transaction switch bus 1419.

In one embodiment, the protocol engine 1408 communicates with the host frame parser 1418 by sending transaction requests via buses 1419 and 1421. The protocol engine-transaction switch bus 1419 includes a data path, miscellaneous control signals, and a transaction request bus which includes all MPA marker related signals as will be described in further detail below. The host frame parser-transaction switch bus 1421 includes a data path, in control signals, and a transaction request bus which includes all of the MPA marker related signals.

Operation of the server 1400 is described in particular below with regard to location, insertion, and removal of MPA markers. Because. MPA markers can occur anywhere in a TCP data segment, it is noted that the markers can occur before an MPA header all the way to before the MPA CRC. Identification and location of these markers is critical to locating the corresponding MPA header, and hence the DDP/RDMAP headers, to allow for processing of data. For aligned FPDUs, location of MPA headers is relatively easy, but for unaligned FPDUs, insertion and removal of these markers is not straightforward, and must be performed without undue latency in order to allow for RDMA over TCP transactions to be performed at 10 Gb/sec (and higher) link speeds. The present invention accomplishes these noted objectives by distributing the tasks associated with marker insertion and removal between the protocol engine 1408 and the host frame parser 1418. By disposing the host frame parser 1418 between the host interface 1406 and the transaction switch 1409, a mechanism is provided that enables on-the-fly placement and removal of markers, but which is controlled by the protocol engine 1408. In addition to insertion and removal of markers, the host frame parser 1418 also performs other in-line operations on packet data flowing to and from the host interface 1406. The host frame parser 1418 is configured to enable the markers to be inserted/removed as data is being transferred from/to the host interface 1406. Consequently, there is no requirement that all of the data corresponding to a DMA transaction be buffered prior to insertion of the markers, or that it be buffered following removal of the markers. In one embodiment, the host frame parser 1418 is disposed within the host interface 1406.

In one embodiment, the protocol engine 1408 sends DMA requests to the host frame parser 1418 via buses 1419 and 1421 in one of the aforementioned transaction requests. Information associated with the placement of MPA markers is also provided to the host frame parser 1418. The host frame parser 1418 stores the provided transaction request and employs the provided marker related information without further instruction from the protocol engine 1408 whenever payloads corresponding to the DMA requests are transmitted/received to/from the host interface 1406. In this embodiment, the protocol engine is configured to issue multiple DMA transaction requests to the host frame parser 1418, and the host frame parser provides for correlation of each set of MPA marker related information with a corresponding set of payload data that is transmitted/received to/from the host interface 1406.

In one embodiment, the marker logic 1420 within the protocol engine 1408 provides the aforementioned MPA marker related information, which includes a marker value and a marker offset for payloads received from the host interface 1406 (i.e., marker insertion) and a marker offset for payloads to be provided to the host interface 1406 (i.e., marker removal). The marker value identifies the value of a first marker to insert, into the payload (i.e., the value of the pointer to the MPA header). The marker offset specifies a byte offset into the current requested host data transfer where the marker value is to be inserted/removed.

For insertion of MPA marker(s), the host frame parser 1406 inserts the first marker as prescribed by the marker logic 1420 and inserts subsequent MPA marker values into the payload by incrementing a current marker value by 512. For example, if the marker logic specifies a marker value of 35 and an offset of 43, then the host frame parser would insert a first marker of 35 at an offset of 43 bytes into the payload. A second marker, if required, having a value of 547 would be inserted into the payload 512 bytes after the first offset location. And so on.

For removal of MPA marker(s) from a payload to be written to host memory 1403, the host frame parser 1418 employs the marker offset prescribed by the marker logic 1420 to locate and remove the first marker from the stream prior to providing the data to the host interface 1406. Subsequent MPA markers are removed by the host frame processor at 512-bytes increments from the location prescribed by the marker offset.

Since MPA markers can occur within the MPA/DDP/RDMAP headers (i.e. not within the data from host memory 1403 which is transferred by the host interface 1406), placement/removal of MPA markers under this case is performed by the marker logic 1420 itself within the protocol engine 1408 rather than by the host frame parser 1418.

Figure 15:
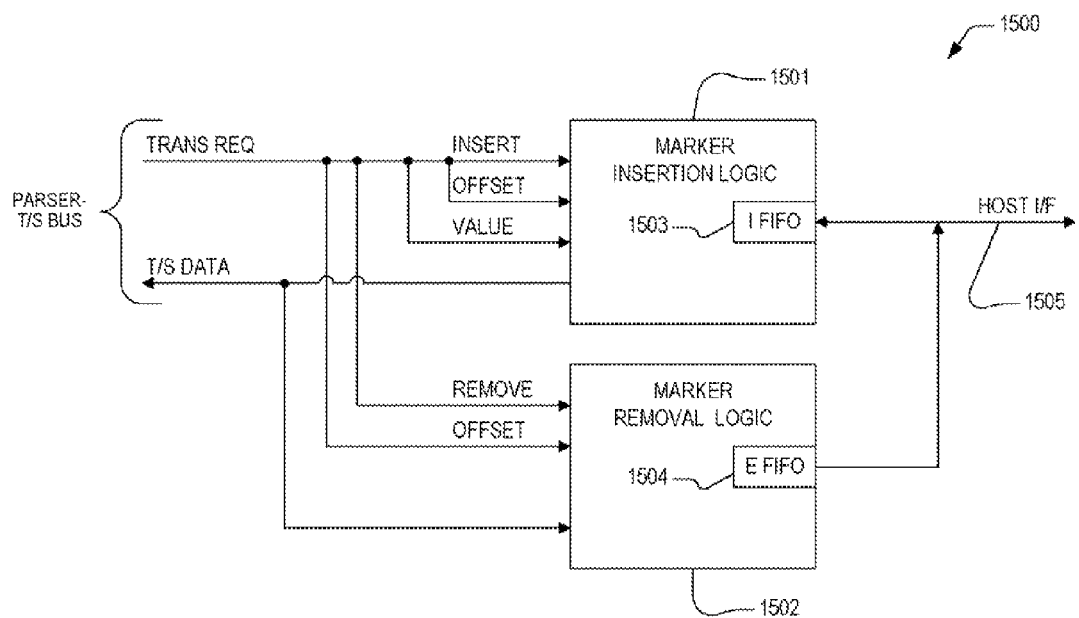
FIG. 15 is a block diagram featuring details of the host frame parser of FIG. 14.

Referring to FIG. 15, a block, diagram is presented featuring details of the host frame parser 1500 according to the present invention, such as is described with reference to FIG. 14. The host frame parser 1500 includes marker insertion logic 1501 that is operatively coupled to a protocol engine (not shown) via the mechanisms described with reference to FIG. 14. The host frame parser 1500 also includes marker removal logic 1502 that is operatively coupled to the protocol engine as well as described above.

For insertion of markers, data is retrieved from the host interface (not shown via a host interface data bus 1505 into an ingress FIFO 1503. The protocol engine directs the marker insertion logic 1501 via a insert signal from the host frame parser-transaction switch bus to insert markers into the memory data provided to the ingress FIFO 1503 that is associated with a corresponding transaction request. As noted above, the marker value and offset are provided to the insertion logic 1501 via value and offset signals. Accordingly, the marker insertion logic 1501 inserts the MPA markers into the associated data and provides formatted data to buffers in the transaction switch over the host frame parser-transaction switch bus i.e., T/S data).

For removal of markers, data is retrieved from the parser-t/s bus. The protocol engine directs the marker removal logic 1502 via a remove signal to remove markers from the provided data that is associated with a corresponding transaction request and to provide the stripped data to an egress FIFO 1504. An offset to the first MPA marker is also provided to the removal logic 1502 via an offset signal. Accordingly, the marker removal logic 1502 removes the MPA markers from the data and provides the data to the egress FIFO 1504, which is then retrieved by the host interface from the host interface bus 1505 and subsequently written to memory.

As noted earlier, the marker logic, in the protocol engine provides for placement and removal of MPA markers when these markers fall within MPA, DDP, or RDMAP header space.

Accordingly, an RDMA-enabled network adapter is provided that can perform in-line on-the-fly insertion and removal of protocol markers for network packet payloads as the payloads are transferred between a host interface and buffers within the adapter.

Although the present invention and its objects, features, and advantages have been described in detail, other embodiments are contemplated by the present invention as well. For example, the present invention has been particularly characterized in terms of a verbs interface as characterized by specifications provided by the RDMA Consortium. And while the present inventors consider that these specifications will be adopted by the community at large, it is noted that the present invention contemplates other protocols for performing RDMA operations over TCP/IP that include the capability to offload TCP/IP-related processing from a particular CPU. As such speculative ULP CRC checking mechanisms according to the present invention may be applied where, say, iSCSI, is employed as an upper layer protocol rather than the RDMA over TCP verbs interface. Another such application of the present invention is acceleration of a conventional TCP/IP connection through interception of a socket send request by an application that is not RDMA-aware.

Furthermore, the present invention has been described as providing for RDMA over TCP/IP connections over an Ethernet fabric. This is because Ethernet is a widely known and used networking fabric and because it is anticipated that the community's investment in Ethernet technologies will drive RDMA over TCP applications to employ Ethernet as the underlying network fabric. But the present inventors note that employment of Ethernet is not essential to practice of the present invention. Any network fabric, including but not limited to SONET, proprietary networks, or tunneling over PCI-Express, that provides for data link and physical layer transmission of data is suitable as a substitute for the Ethernet frames described herein.

Moreover, the present invention has been characterized in terms of a host interface, that is embodied as PCI-X or PCI Express. Such interconnects today provide for communication between elements on the interconnect and a memory controller for the purpose of performing DMA transfers. But the medium of PCI is employed only to teach the present invention. Other mechanisms for communication of DMA operations are contemplated. In fact, in an embodiment where an RDMA-enabled network adapter according to the present invention is entirely integrated into a memory controller, a proprietary bus protocol may allow for communication of DMA transfers with memory controller logic, disposed therein as well, in complete absence of any PCI-type of interface.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. An apparatus comprising:
an adapter to be communicatively coupled to a host interface via an interface of the adapter, the adapter also including at least one network port to be communicatively coupled to a network and to receive one or more frames from the network;
the adapter including an engine and adapter memory, the adapter to selectively permit data transfer between the at least one port, the engine, and adapter memory, the engine being able to perform processing related to protocol offload and checksum calculation based upon a received transport protocol control (TCP) segment from the one or more frames, the adapter being able to determine whether the TCP segment belongs to an accelerated connection, the adapter also being able to perform one or more additional CRC offload-related operations based upon whether the TCP segment includes certain upper level internet small computer system interface (iSCSI) protocol header information and belongs to the accelerated connection, the one or more additional CRC offload-related operations being related to offloading CRC checking of the certain upper level iSCSI protocol header information and also being in addition to an offloaded TCP CRC validation.

2. The apparatus of claim 1, wherein:
a host memory is to comprise a transmission control protocol/internet protocol(TCP/IP) stack to perform TCP/IP processing for an unaccelerated TCP connection; and
the adapter is to deliver the TCP segment to the stack for the TCP/IP processing if the TCP segment belongs to the unaccelerated connection.

3. The apparatus of claim 1, wherein:
the adapter is to:
    perform other remote direct memory access (RDMA) protocol processing; and
    determine whether the TCP segment includes an RDMA framed protocol data unit.

4. The apparatus of claim 1, wherein:
the host interface is comprised in a first server;
the one or more frames are to be issued from a second server; and
the adapter is to be comprised in the first server.

5. A method comprising:
communicatively coupling an adapter to a host interface and to a network, the adapter to receive one or more frames via the network;
the adapter including an engine and adapter memory, the adapter to selectively permit data transfer between at least one adapter port, the engine, and the adapter memory, the engine performs processing related to protocol offload and checksum calculation based upon a received transport protocol control (TCP) segment from the one or more frames, the adapter determines whether the TCP segment belongs to an accelerated connection, the adapter also performs one or more additional CRC offload-related operations based upon whether the TCP segment includes certain upper level internet small computer system interface (iSCSI) protocol header information and belongs to the accelerated connection, the one or more additional CRC offload-related operations being related to offloading CRC checking of the certain upper level iSCSI protocol header information and also being in addition to an offloaded TCP CRC validation.

6. The method of claim 5, wherein:

a host memory is to comprise a transmission control protocol/internet protocol(TCP/IP) stack to perform TCP/IP processing for an unaccelerated TCP connection; and the adapter is to deliver the TCP segment to the stack for the TCP/IP processing if the TCP segment belongs to the unaccelerated connection.

7. The method of claim 5, wherein:

the adapter is to:

perform other remote direct memory access (RDMA) protocol processing; and determine whether the TCP segment includes an RDMA framed protocol data unit.

8. The method of claim 5, wherein:

the host interface is comprised in a first server;

the one or more frames are issued from a second server; and the adapter is comprised in the first server.

\* \* \* \* \*